United States Patent
Noskov et al.

(10) Patent No.: US 12,517,965 B2
(45) Date of Patent: Jan. 6, 2026

(54) SYSTEMS AND METHODS FOR IDENTIFYING INTERESTS BASED ON SOCIAL MEDIA ACTIVITY

(71) Applicant: Socialprofiler LLC, Laguna Niguel, CA (US)

(72) Inventors: Anatoly Noskov, Laguna Niguel, CA (US); Artem Korolev, Vrdnik (RS)

(73) Assignee: Socialprofiler LLC, Laguna Niguel, CA (US)

( * ) Notice: Subject to any disclaimer, the term of this patent is extended or adjusted under 35 U.S.C. 154(b) by 0 days.

(21) Appl. No.: 18/416,565

(22) Filed: Jan. 18, 2024

(65) Prior Publication Data

US 2024/0256619 A1 Aug. 1, 2024

Related U.S. Application Data

(60) Provisional application No. 63/440,538, filed on Jan. 23, 2023.

(51) Int. Cl.
| | |
|---|---|
| *G06F 16/9536* | (2019.01) |
| *G06F 16/901* | (2019.01) |
| *G06Q 50/00* | (2012.01) |
| *H04L 67/306* | (2022.01) |

(52) U.S. Cl.
CPC ...... *G06F 16/9536* (2019.01); *G06F 16/9024* (2019.01); *G06Q 50/01* (2013.01); *H04L 67/306* (2013.01)

(58) Field of Classification Search
CPC ............ G06F 16/9536; G06F 16/9024; G06Q 50/01; H04L 67/306
See application file for complete search history.

(56) References Cited

U.S. PATENT DOCUMENTS

| | | | |
|---|---|---|---|
| 2013/0054699 A1* | 2/2013 | Macaskill | G06Q 10/101 709/204 |
| 2014/0337436 A1* | 11/2014 | Hoagland | G06F 16/24568 709/204 |
| 2015/0264092 A1* | 9/2015 | Herger | G06F 16/9535 709/204 |
| 2016/0048556 A1 | 2/2016 | Kelly et al. | |
| 2019/0073734 A1* | 3/2019 | Reischer | G06F 16/9535 |
| 2020/0134009 A1* | 4/2020 | Zhao | G06F 16/9535 |

OTHER PUBLICATIONS

International Searching Authority of the PCT (US); Notification of Transmittal of the International Search Report and the Written Opinion of the International Searching Authority, or the Declaration dated Apr. 17, 2024; PCT Application No. PCT/US24/12032 filed Jan. 18, 2024; pp. 1-10 (2024).

* cited by examiner

*Primary Examiner* — Kannan Shanmugasundaram

(74) *Attorney, Agent, or Firm* — FisherBroyles LLP; Alan D. Minsk

(57) ABSTRACT

Systems, devices, and methods for identifying a person's interests based at least in part on their interactions with social networks, where "interests" may refer to a person's hobbies, opinions, behaviors, goals, memberships, or activities, as non-limiting examples. The person's interactions with social networks may include postings of comments, articles, or images, indicating a like or dislike for a posting of another person, "following" an account, performing a search, or the type of networks or social media they engage with (which may be associated with a social or political goal, as a non-limiting example).

20 Claims, 10 Drawing Sheets

| 139428 | designlovesdetail peteandselena katemarket·interiors ivoryandbone blushingboho prettydomesticated theidentitecollective halfway_wholeistic designsixtyfive theheartandhaven lindseyhomedesign angelarosehome lark·interiors tabarkastudio danielleoakeyshop whittneyparkinson michelle_janeen twineandtrowelhome blackard_modernfarmhouse almafied jaci.daily viewfrommyheels lexiwestergard_design lindsay_hill·interiors parkandoakdesign house.becomes.home house_sprucing susanconnor_ny remingtonavenue coco.and.jack raena·interiors whitneyandcodesign lexigracedesign marieflanigan·interiors puresalt·interiors restored_haven audreycrisp·interiors klhcustomhomes virginia.farmhouse.project cynthia_harper_southharlow brimoysa the_cornellranch woodandivory carcabaroad crystalann·interiors tinaramchandani justindoylehomes christinajwarren thelifestyledhome joannahaines ninawilliamsblog finding_lovely thewarrenhaus claymclaurinstudio vintagerugshop shelterresidential the_fox_group_ highstreetmarket palmandprep frengpartyof5 my_norfolk_nest remedy.design |
|---|---|

FIG.1(g)

SYSTEMS AND METHODS FOR IDENTIFYING INTERESTS BASED ON SOCIAL MEDIA ACTIVITY

CROSS REFERENCE TO RELATED APPLICATIONS

This application claims the benefit of U.S. Provisional Application No. 63/440,538, entitled "Systems and Methods for Identifying Interests Based on Social Media Activity," filed Jan. 23, 2023, the disclosure of which is incorporated, in its entirety (including the Appendix), by this reference.

BACKGROUND

Many people use social media networks and groups within networks to post information about themselves, to "follow" others and their posts, or to engage in an activity with other members of a social network. In some cases, these posts and other interactions with a social network or social media (such as articles, images, or comments) may be indicative of a persons' interests or opinions.

This information may be valuable if a person's interests or opinions might make them suitable for a job or other responsibility, or even for membership in a group or club devoted to a specific cause. Such information may also make them a more desirable recipient of an advertisement or promotional offer or suggest an area in which further investigation would be advisable to determine if someone is a suitable candidate for a job or responsibility.

Conventional approaches to identifying and evaluating a person's interactions with social media typically encounter two primary problems: (1) identifying the same person across multiple social media accounts, as a person may use different names or identifiers when interacting with different networks, or have a common name; and (2) determining a person's interests and providing a concise way to represent those interests so that the interests can be used to make a decision regarding hiring, partnership, group membership, or to indicate a potential problem with interacting with the person.

Embodiments of the disclosure overcome these and other disadvantages of conventional approaches to identifying and evaluating a person's interactions with social media, both collectively and individually.

SUMMARY

The terms "invention," "the invention," "this invention," "the present invention," "the present disclosure," or "the disclosure" as used herein refer broadly to the subject matter disclosed and/or described in this document, the drawings or figures, and to the claims. Statements containing these terms do not limit the subject matter disclosed or described, or the meaning or scope of the claims. Embodiments of this disclosure are defined by the claims and not by this summary. This summary is an overview of various aspects of the disclosure and introduces some of the concepts that are further described in the Detailed Description section. This summary is not intended to identify key, essential, or required features of the claimed subject matter, nor is it intended to be used in isolation to determine the scope of the claimed subject matter. The subject matter should be understood by reference to appropriate portions of the entire specification, to any or all figures or drawings, and to each claim.

This disclosure is directed to systems, devices, and methods for identifying a person's interests based at least in part on their interactions with social networks. In some embodiments, the identified interests may be used as part of a process to evaluate a person's suitability for a role, task, membership, job, or other aspect.

As used herein, "interests" may refer to a person's hobbies, opinions, behaviors, goals, memberships, or activities, as non-limiting examples. In the context of this disclosure, a person's interactions with a social network may include postings of comments, articles, or images, indicating a like or dislike for a posting of another person, "following" an account, performing a search, or the type of networks or social media they engage with (which may be associated with a social or political movement or goal), as non-limiting examples.

In one or more embodiments, the disclosure is directed to a method for identifying a person's interests based at least in part on their interactions with social networks. In one embodiment, the data processing flow and associated logic implemented as part of the disclosed approach may comprise:

For each of one or more social networks (e.g., Instagram, Twitter, Facebook, or TikTok, as non-limiting examples);
    Identify a recommendation or similar process used by the network for generating an account or content that might be of interest to a specific user/account;
        This recommendation (or similar) process is used as a starting point to generate a map, graph, or other form of representation (such as a network "model" of nodes representing accounts and connections between the nodes) of accounts with a similar or related interest to another account;
    As an example, an account on a social network platform may be identified (such as a blogger or influencer) and a recommendation function or similar feature of the platform used to generate one or more accounts that the social network expects might be of interest to the identified account—this process may be continued iteratively to construct a "map" of a set of accounts in the social network that have some relationship (such as an expected common interest) to others in the map;
    In one embodiment, the mapping process begins with an account, generates nodes representing other accounts expected to be related to or representative of accounts having a similar interest or content to the initial account, and then continues with each new node in the same manner to develop a more comprehensive mapping;
    The result is a set of nodes, with each (or most) node(s) connected to one or more other nodes. The nodes connected to a specific node represent accounts that are expected to be of interest to the account represented by the specific node;
    In one embodiment, the account or accounts used to generate the network mapping may belong to a specific type of account, such as one associated with a blogger or influencer;
    The network mapping showing connections between an account (node) and other accounts (nodes) may then be used to identify clusters or groupings of accounts belonging to users/accounts expected to have a similar interest (such as by having posted or engaged with similar content);
  This may include identifying the basis for a connection between accounts based on indications of one account following another and/or demonstrating interest in content associated with another account (such as by re-posting, liking, commenting, or other action);
  This may involve use of a technique to identify a set of nodes that form a cluster based on one or more characteristics of the structure of the network in the region around the nodes (such as by using the BigCLAM and/or CRank techniques discussed herein);
The interest(s) or topic(s) associated with an account or group of accounts that form a cluster are then determined (or at least suggested) using one or more techniques, such as (but not limited to) natural language processing (NLP), natural language understanding (NLU), image processing, name recognition, or other relevant and suitable technique;
  As non-limiting examples, the interest or topic associated with an account or group of accounts may be determined by recognition of a keyword or object common to an account or to multiple accounts, a similarity of content in one account or accounts (which as an example, may be determined by a specific metric or embedding), or other characteristic of a topic associated with content posted by members of a group of accounts;
For a specific person of interest (i.e., the one whose interests and/or risk are to be evaluated), identify one or more social network accounts associated with the person;
  This assists in aggregating the person's social network and social media interactions across accounts in different networks or that are accessed through different applications;
    In one embodiment, a "matching" algorithm or sequence of steps may be used to identify what is believed to be the same person in different networks, where the person may use a different account name in a different network or application;
    The matching function may be based on common friends or contacts associated with an account for accounts in different networks, suggesting that the person using the accounts in the two networks is the same person, although using a different name or identifier in the two networks;
    In one embodiment, a process flow described herein may be utilized to "disambiguate" between multiple accounts that are associated with a person having the same (and in some cases, common) name, such as John Smith;
      This process or technique is described in detail with reference to FIG. 1(f);
Aggregate data and information associated with the specific person's activities and interactions from the identified accounts across the one or more networks;
  This provides a fuller and more complete "picture" of the person's social network and social media interactions;
Determine the specific person's interests based on the aggregated data and information;
  Determine groups or clusters of network accounts the specific person may find of interest or have similar characteristics to in each social network;
    This may be done using the network recommendation function or feature to find other accounts (nodes) in the previously constructed network mapping that are suggested to the account representing the specific person, and finding one or more groups or clusters to which the recommend accounts belong;
    In some cases, this may be done by identifying a cluster or clusters containing a node corresponding to the specific person from the previously constructed network mapping (e.g., in the case where the specific person was part of the set of accounts used to generate the network mapping);
  In one embodiment, this may be based on text and images the specific person posts or engages with;
  As mentioned, an interest may be determined based on analysis of the described mapping or network graph representing a set of accounts that form a community/cluster having a common interest (typically as indicated by common topics of discussion, "likes", posted content, or other indications of a common interest);
    As described, an interest or topic may be associated with a group or cluster of accounts that belong to each social network—this information may be used to determine one or more likely interests of the specific person by identifying groups or clusters with which they are associated and/or to which they are recommended, and the topic or interest associated with that group or cluster;
      In one embodiment, a vector representation of an image and/or text may be generated for one or more of the specific person's interactions with social media using an embedding technique;
        For example, an embedding of text may be generated using a suitable NLP technique, or an image may be processed using a convolutional neural network or other image processing technique;
      The generated vector representation(s) for the specific person and other accounts in a network may be indexed and encoded to assist with efficient searching for "similar" posts, content, or images;
        The identified "similar" posts, content, or images may then be used as a "key" to identify accounts (and then groups and topics of interest) that are believed similar to, or representative of the specific person's interests;
  In one embodiment, a person's "followings" (the topics or accounts a particular person follows, as represented by a "followings" graph of nodes and edges) may be used as part of identifying a specific person's interests, with the application of one or more naming techniques to the nodes;
    Note that the nodes are not limited to people, and may represent almost any type of account, including personal accounts (people), business accounts, non-profit organization accounts, non-incorporated groups accounts (e.g., a cat lovers group Instagram account), or a fan group account, as non-limiting examples—each of these may provide clues as to a person's interests.
  As suggested, a network graph or map may be generated and used to represent a set of accounts/people (nodes) and connections between accounts/people (edges). The graph may be traversed and analyzed to identify communities or sets of users and to generate a metric or label representing one or more qualities or characteristics of a community or set of users. This may be done as part of identifying a set of users that are believed to form a group having a common interest (i.e., a "valid" group for purposes of assigning a common label or interest description). In some embodiments, this processing flow may comprise:

Examining the identified communities or sets of users to determine a common interest represented by the community or set of users;
  As mentioned, the common interest may be determined from topics discussed within the community, labels associated with members of a community, posted content (articles, images, comments), connections to other groups with an identified interest, or other suitable methodology;
  In one embodiment, the CRank method of prioritization from the SNAP library may be used to assist in identifying a set of accounts that form a group by virtue of having values or a range of values for specific metrics related to the structure of the network in the region around that set of accounts;
 In some embodiments, it may be desirable to determine if a person is an opinion leader for a community, where that community or group may be one of the previously identified ones, or a different one;
  This can help to expand the set of interests associated with a person;
  This can also assist in determining the strength of an interest and/or the impact of a person's social network interactions on others, which may be a factor in determining the risk the person's interests and interactions pose to an organization or to others;
   For example, a person viewed as a community or group leader may be able to mobilize others to take an action that may impact others or an organization;
 Construct a hierarchy or model of the person's interests to assist in determining the relative strength of and relationships between their interests;
  This may also suggest associated interests or common aspects of a set of interests, either of which may provide an indication of a risk.

Next, based on the person's interests, the relative strength of the interests, and relationships between interests, it is desirable to determine if that information suggests a risk or area of concern;
 This determination may be specific to the context in which the person's interests are being determined (such as a job, a task, a role, or a responsibility, as examples);
 The "risk" may take one of multiple forms, including but not limited to reputational risk, brand risk, health risk to others, financial risk, or a safety risk to themselves or others, as non-limiting examples;
 The degree of risk may be based on a ruleset, algorithm, heuristic, or trained model that considers one or more interests, factors, or characteristics of the person and generates a metric or decision regarding the "amount" of risk posed by the person, and/or if the risk exceeds a threshold value and should be noted as indicating a potential concern.

In one embodiment, the disclosure is directed to a system for identifying a person's interests based at least in part on their interactions with social networks. The system may include a set of computer-executable instructions stored in (or on) a data storage device or memory (such as one or more non-transitory computer-readable media) and an electronic processor or co-processors. When executed by the processor or co-processors, the instructions cause the processor or co-processors (or a device or apparatus of which they are part) to perform a set of operations that implement an embodiment of the disclosed method or methods.

In one embodiment, the disclosure is directed to a set of one or more non-transitory computer-readable media containing a set of computer-executable instructions, wherein when the set of instructions are executed by an electronic processor or co-processors, the processor or co-processors (or a device or apparatus of which they are part) perform a set of operations that implement an embodiment of the disclosed method or methods.

In some embodiments, the systems and methods disclosed herein may provide services through a SaaS or multi-tenant platform. The platform provides access to multiple entities, each with a separate account and associated data storage. Each account may correspond to a set of people, a source of data (such as a specific social network), or an organization (such as an employer or an investigative agency), for example. Each account may access one or more services, a set of which are instantiated in their account, and which implement one or more of the methods or functions disclosed herein.

Other objects and advantages of the disclosed systems, apparatuses, and methods will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in further detail herein. However, embodiments are not limited to the specific or example forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, in which:

FIG. 1(g) is an example output file illustrating a set of nodes (the first address or identifier in a row) and examples of nodes/accounts "connected" to those nodes (other addresses or identifiers in the row);

Note that the same numbers are used throughout the disclosure and figures to reference like components and features.

DETAILED DESCRIPTION

Figure 1A:
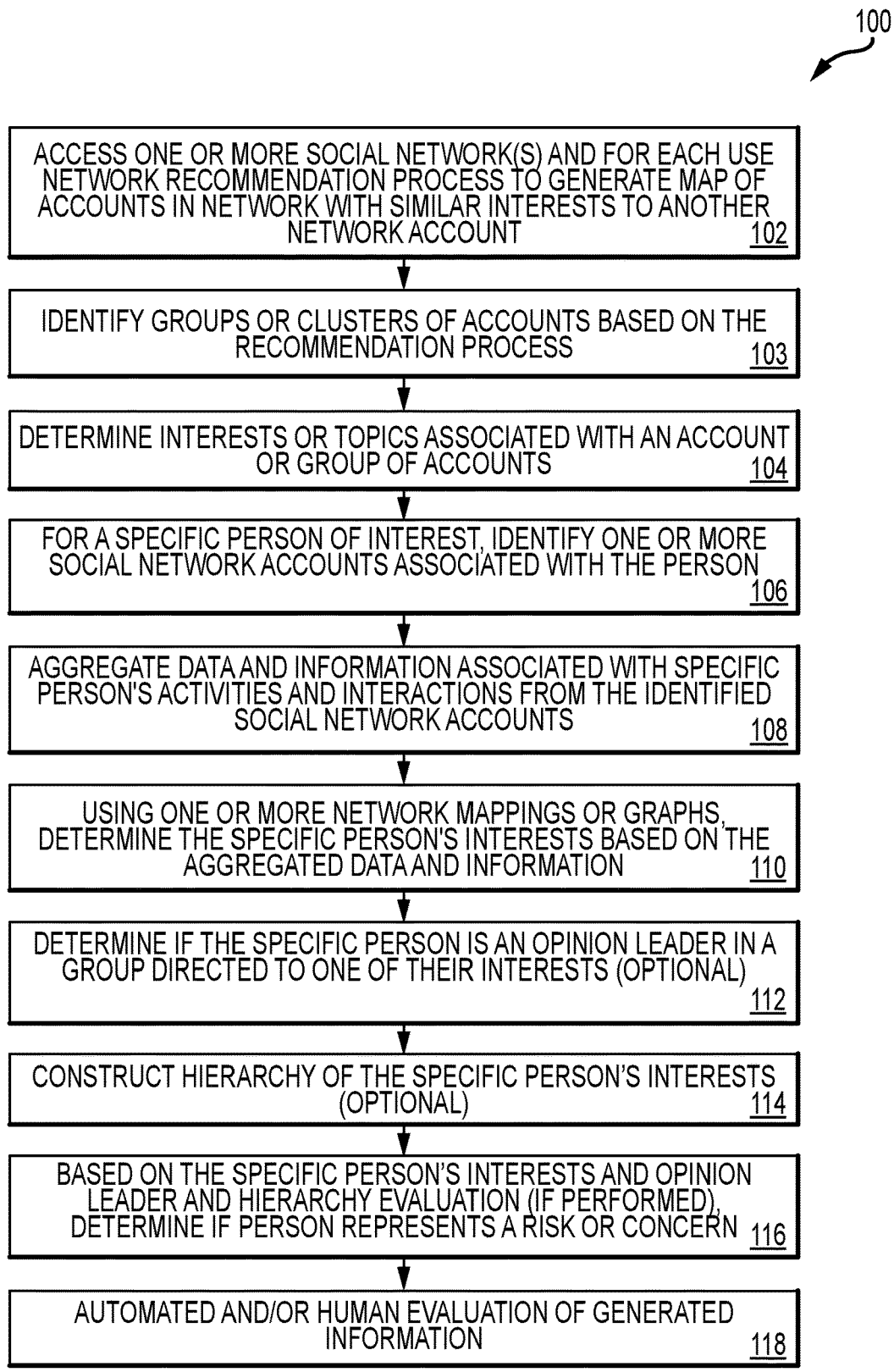
FIG. 1(a) is a flow chart or flow diagram illustrating a method, process, operation, or set of functions that may be used in implementing an embodiment of the disclosure.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter are described more fully herein with reference to the accompanying drawings, which illustrate examples by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by a suitable processing element or elements (such as a processor, co-processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user over a network (e.g., the Internet) through a transfer of instructions or an application that executes a set of instructions.

In some embodiments, the systems and methods disclosed herein may provide services through a SaaS or multi-tenant platform. The platform provides access to multiple entities, each with a separate account and associated data storage.

Each account may correspond to a set of people, a source of data (such as a specific social network), or an organization (such as an employer or an investigative agency), as non-limiting examples. Each account may access one or more services, a set of which are instantiated in their account, and which implement one or more of the methods or functions disclosed herein.

In some embodiments, one or more of the operations, functions, processes, or methods disclosed herein may be implemented by a specialized form of hardware, such as a programmable gate array, application specific integrated circuit (ASIC), or the like. An embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

As mentioned, conventional approaches to evaluating a person's interactions with social media typically encounter two primary problems: (1) identifying the same person across multiple social media accounts, as a person may use different names or identifiers when interacting with different networks; and (2) determining and providing a concise way to represent a person's interests in a way that can be used to make a decision regarding a hiring, partnership, group membership, safety risk, brand or reputational risk, or to indicate a potential problem that may arise from interacting with the person.

Conventionally, a person may be identified across multiple networks by use of a matching process, based on a phone number, email, direct link to other social network or username found in a person's user profile. While reliable, this approach has inherent limitations and does not provide a complete picture of the person's interactions if the person has not associated their phone number or other personal information with multiple social network accounts.

Similarly, a person's interests may be determined using a trained machine learning model that operates to classify a set of input data representing a person's interactions with social networks. However, this requires sufficient training datasets (i.e., features that are typically extracted from posts or produced by image processing, as examples), and human or programmatic labeling. In addition, a person's interests may be difficult to identify or parse from other information so that a trained model may not provide a complete and/or accurate enough indication of their interests.

In contrast to conventional approaches, embodiments of the disclosure implement a process flow that uses an overlap or commonality of the connections, posts, followings (following activities), or "friends" of a person in different networks to associate an account in each network with the same person. This process can be used to identify other accounts associated with a person and/or accounts associated with their connections or friends (which may contain information useful in identifying an interest).

As a non-limiting example, in one embodiment a person/account believed to be the same may be identified in two different social networks. The process may then download a list of the names and/or usernames of the person's friends or connections in each network. The list of names and/or usernames may then be normalized into a common format. Next, the process assumes that if a person has the same friends' names (or a sufficient number of them) in different social networks, then those friends may be the same people, and the person may be the same person but posting in more than one network. This allows accounts in different social networks to be combined into one persona; the process can be repeated to construct a set of accounts in different social networks that presumably belong to the same person.

In addition to the process flow used to identify the same person in different social networks based on an overlap or commonality of connections (and/or posts, friends, or activities, as non-limiting examples), embodiments may implement a form of image processing as part of identifying a person from images posted on a social network. For example, this may be used to process an image in one network and use the output of the processing to identify (or confirm the identification of) the same person (who may be a person of interest, connection, or friend) in another network.

Conventionally, image processing is performed by a computer vision (CV) algorithm after a set of images are collected and cropped to remove backgrounds, where the algorithm operates to vectorize one or more faces in an image. However, the conventional approach to processing images to identify a person has several disadvantages. These include one or more of the search speed over the output of the algorithm, the accuracy of the results, the amount of disk space needed to store the data generated by the algorithm, and the amount of random-access memory used in processing and accessing the generated data.

In contrast to conventional approaches to image processing, embodiments may implement a set of processes that operate to improve search speed and accuracy and reduce memory storage requirements for the processed images. In one embodiment, this may include use of an internally trained computer vision algorithm based on the ArcFace[1] architecture. In this example embodiment, to collect a sufficient dataset for training, the inventors used an approach consisting of the following steps, stages, operations, or processes:

[1] ArcFace:AdditiveAngularMarginLossforDeepFaceRecognition, https://arxiv.org/pdf/1801.07698v2.pdf.

1) collecting photos from a user's account;
2) face cropping using a HOG (histogram of oriented gradients)[2] filter;
3) open dlib models (for example, https://github.com/ageitgey/face_recognition_models) to obtain embeddings;
4) further computing the most popular subset of embeddings that represent the owner of the account. As an example, this may be done using a distance matrix between samples.

[2] The histogram of oriented gradients (HOG) is a feature descriptor used in computer vision and image processing for the purpose of object detection. The technique counts occurrences of gradient orientation in localized portions of an image. This method is similar to that of edge orientation histograms, scale-invariant feature transform descriptors, and shape contexts, but differs in that it is computed on a dense grid of uniformly spaced cells and uses overlapping local contrast normalization for improved accuracy. See Wikipedia.

Using this algorithm iteratively, a dataset of for use in training was constructed that included 100 thousand identities and approximately 6 million images.

In one embodiment, a computer vision algorithm is used to process an image and generates a list of parameters associated with or derived from the image. The parameters may include (as non-limiting examples) gender, age, or face alignment, and embeddings representing the image. A library of routines that enable efficient search and clustering of dense vectors is then applied to the collected image vectors.

In one embodiment, FAISS (Facebook AI Similarity Search)[3] is a library used to enable an efficient search operation to identify the (k) nearest vectors to a specified vector, (x) (and hence indicate a degree of similarity within a search space). One aspect of FAISS is that of an index, which is a set of parameters and vectors. FAISS parameter sets can be different and depend on a user's needs. Vectors can remain unchanged, or they can be rebuilt. Some indexes are available for use when vectors are added to them, and some require prior learning. Vector names are stored in the index, either in a numbering from zero to n, or as a number that fits the Int64 type.

[3] Further information regarding the operation and functionality of FAISS may be found in the following article: https://medium.com/dotstar/understanding-faiss-part-2-79d90b1e5388.

A feature of FAISS is the Inverted File Index (IVF). This feature enables a relatively fast search of a set of vectors, where each vector may represent text or an image. However, even if this works in principle, the IVF may be too large to fit into the RAM of a device and be operated upon. FAISS provides a solution to this problem by using vector coding to reduce the storage requirement. This enables storage of the IVF on disk with only the metadata loaded into RAM.

In this context, vector coding refers to Scalar Quantization (SQ) and Product Quantization (PQ) and operates as a form of data compression. SQ is an encoding of each vector component with n bits (typically 8, 6, or 4 bits). However, in some cases PQ may be preferable because encoding one component of float32 type data with eight bits may entail an undesirable loss of accuracy (although in some cases, compressing SQfp16 to float16 type may be almost lossless in terms of accuracy). As an example, in one case with 315 million vectors, the index occupied 22 GB of disk space and approximately 3 GB of RAM when in use.

As discussed, in one embodiment, identifying a person as being associated with more than a single social network or social media account may involve a form of matching, using a name, a nickname, and/or a telephone number as identifying data. For example, if the same nickname/userID is present on two different social networks, and that nickname or userID is considered sufficiently rare, then the process assumes the person associated with the nickname is the same.

Note that since the nicknames in the two networks are unique entities, and the process needs to choose the rarest of them and try to match up accounts in the two networks using that information, taking a quantile is not expected to be effective. The frequency of each nickname will be somewhere around 1. Therefore, it is proposed to cluster the nicknames, which will automatically put nicknames such as alex.jones and racheldikkins in one cluster (contains only names and surnames), and me_and_jesus_together and gatlingsauce in another (contains some expression of an emotion, as a non-limiting example). Based on this observation, the process uses the second cluster type for matching nicknames.

In one embodiment, telephone number matching may incorporate a process or operation that accesses data made available due to a breach or other unauthorized publication of an organization's membership list, contact information for customers or clients, or other form of identifiers. For example, a database of a bank, store, media platform, social network, or social research site may have been made publicly available because of a cyber-attack. Such databases often contain information that may be matched to a person, such as cell phone number, email address, passport number, or driver's license number.

Even if a database does not contain data directly identifying a person, it may still contain data in the form of latent characteristics, such as a clickstream analysis of a person by site transitions and time of an event, or users' interaction information while visiting a particular site. In such cases, using timestamps the disclosed process flow can establish that two sets of data are associated with the same person.

After determining one or more sets of text, posts, comments, or images believed to be associated with the same person, embodiments of the disclosed process determine the interests associated with a person based on their social media account activity. As described, one way to identify one or more interests of a person is to identify a group or cluster of accounts with which they are associated (i.e., connected or part of based on a network graph) and determine a category or classification of the primary topic of interest of the group or cluster.

In one embodiment, a process examined recommendations of a set of bloggers or influencers, where the recommendations included other accounts of potential interest. For example, one blogger has close to 80 profiles in their recommendations. Based on a list of 1000 bloggers in the United States, similarity measures were used iteratively to identify accounts belonging to a common category and representing a common interest or subject.

In one embodiment, this was based on the clustering performed by Instagram, whose researchers use their computational resources to identify similar accounts. Due to this processing, the task of identifying interests is partially solved by the already implemented Instagram recommendation system. In one example, a list was collected by parsing a random sample of Instagram subscribers with country (U.S.) affiliation determined based on geotags, the use of English, and specific hashtags collected manually.

The described processing of blogger originated data produced a graph with 3,428,453 vertices (bloggers) and 96,967,974 edges (representing a measure of the similarity or connection of two bloggers among themselves). As an example, when using Instagram, if a user visits the National Geographic account, then Instagram prompts the person to subscribe to "similar" accounts. This would make National Geographic the first node in a graph of relationships. The recommendations provided by Instagram result in N<80 nodes. The National Geographic node is associated with one or more edges, with each corresponding to a recommendation/node. Next, the disclosed and/or described process takes the first recommendation and determines what recommendations Instagram generates from it. This produces a new set of nodes and edges between recommendations. This process flow can be repeated for multiple iterations to construct or generate a map of a social network or a portion of it.

In one embodiment, blogger originated posts or information were used for one or more of the following reasons:
  A blogger is more consistent, in terms of interest. They tend to not mix multiple interests as would a normal user, most likely because they have decided to specialize in a specific subject;
  A blogger has many (more than a typical user) followers, so determining an interest for a blogger allows the approach to identify a larger group of "interested" persons, based on a finite and more manageable number of accounts, thus preserving resources; and
  The recommendation system that is part of a social network works for bloggers, allowing the approach to work with a cluster of interests, which makes the process of identifying interests and interested persons more efficient.

It is important to mention the following aspects of the disclosed and/or described approach. Firstly, Instagram is a non-limiting example of a social network to which the disclosed and/or described processes may be applied. As a form of generating recommendations or suggested accounts to a user is available in other social networks, the disclosed and/or described approach can be applied to existing or future social networks.

Secondly, the recommendations generated by a social network's internal processes are used (as disclosed and/or described herein) to provide a set of potentially related accounts for further evaluation as a group or cluster. Recommendations are used to identify accounts, groups, or clusters having a common or related interest, and the content or actions of the members of that group or cluster are used to associate an interest or topic with the group or cluster. This set of information may be used to generate a report or risk evaluation for a specific user based on the groups or clusters they are believed to be a part of or associated with, such as the groups whose members they follow or comment about.

As discussed, given a social network graph with a large set of nodes and edges, an embodiment of the disclosed process analyzes the network graph to identify common communities, clusters, or groupings of nodes. This information can be used to identify the interests of a node or nodes in that community or group (or one with which a specific account is associated). This approach is based on the observation that connections between nodes may be indicative of a common community or group, and a common community or group may indicate a shared interest (based on the topics discussed within the community, posted content, or a label assigned to the community, as examples). Therefore, a connection or association among nodes in a group may suggest a group having a specific interest, particularly if there is supporting "confirmation" provided by membership in multiple communities or groups having a similar interest.

In some embodiments, after identifying a group or groups believed to have a common interest, that interest is identified by examining posted content, classifications of text or images generated by a trained model, or frequently used terms or topics, as non-limiting examples. In some embodiments, after identifying a group or groups having a common interest, that interest can be confirmed by other trained models that examine posted text, implement a topic modeling algorithm, or apply a form of computer vision detection to an image, as non-limiting examples.

As mentioned, in one implementation of an embodiment, a graph was compiled from Instagram based on its internal recommendation system, which is designed to identify similar accounts to Instagram accounts. For example, a user can access a larger account and see which accounts on Instagram are considered similar to it.

This can be used to facilitate the construction of a graph or map in which the nodes are Instagram accounts, and the edges represent a connection between an account (node) and a recommended account. This results in the nodes linked to another node (or to each other) being accounts that are believed to be similar in some sense, such as having a common interest, subject, content, or meaning. For example, they might be accounts related to the same topic or activity, such as archery.

However, someone in an account associated with archery (as an example) may have other interests as well, such as mountain photography and the node representing them may be "close" to a group of mountain photography accounts based on content or other indication of an interest. Such an archer-photographer is an example of an account having a connection to more than a single community. Based on work performed by the inventors, it is believed that finding such accounts allows BigCLAM (the Cluster Affiliation Model for Big Networks from the Stanford Network Analysis Platform (SNAP)) to better separate one community from another. This has been confirmed in practice; the more joins or connections to different communities that an account has, the less central that account is to the initial or base community, and this provides an effective way to differentiate one community from another.

To perform the disclosed and/or described network analysis, a suitable network analysis and graph library was selected. In one embodiment, this was the Stanford Network Analysis Platform (SNAP)[4], a general-purpose network analysis and graph mining library. The library is written in C++ and scales to large networks with hundreds of millions of nodes, and billions of edges. It efficiently manipulates large graphs, calculates structural properties, generates regular and random graphs, and supports attributes on nodes and edges.

[4] See https://snap.stanford.edu/.

The processing algorithm chosen from the SNAP library was BigCLAM (Cluster Affiliation Model for Big Networks). This algorithm is highly scalable and seemed most likely to be suitable for use with graphs of the type generated by the disclosed and/or described process flows. BigCLAM allows specification of the number of communities and the interval representing the range in the number of communities. In some embodiments, the BigCLAM algorithm selects 20% of node pairs for testing, and 80% of the node pairs are used for training purposes.

In one sense, portions of the disclosed and/or described processing may be represented as a form of matrix multiplication. Assume it is possible to construct a table or dataset containing words used in posts, but not an identification of a topic associated with a post. It is desired to generate a topic associated with a set of words, as this would provide a way to identify topics in new posts based on the words appearing in a new post.

Using linear (matrix) algebra, if one could multiply a set of topics of posts by a set of words, the result would provide a set of topics of words. This suggests finding a set of data (in this case, topics of posts) so that in both datasets (i.e., a training sample and in the sample used for a test of the trained model), the topics were identified unambiguously. As one approach, a dataset is divided into two parts for that purpose; 80% of the dataset is used to find the data for training (topics of posts), and 20% of the dataset is used to validate the trained model. A similar approach may be applied to the recommendation system graph, but with graph nodes instead of words.

As mentioned, a connection (an edge in a graph) between nodes may be used as a basis for identifying the common groups or communities to which the nodes belong, and as a result, the interests of the users represented by the nodes. As a corollary, sharing one or more communities with another node may indicate a connection between those nodes. This may be used to identify nodes representing the same person but having different names or identifiers, or two people who know each other directly. Further, the length of time a node has "resided" in a community or group may be used as a weighting factor when determining or inferring a likely interest as it may be indicative of the relative strength of an interest or whether an interest is currently an active one. This concept is sometimes referred to as "overlapping detection"[5].

[5] The significance of this concept is discussed at https://cs.stanford.edu/people/jure/pubs/communities-pieee14.pdf.

Next, a file is generated that contains a list of source nodes and corresponding target nodes (those connected by an edge to a source node). In one embodiment, BigCLAM generates a text output, with each row being an account "nickname" corresponding to a user, followed by a connected node name. Each row may represent an identified grouping or community based on a set of connections and therefore an assumed common interest. The output file may be searched to identify "members" of a particular group or community. The greater the number of usernames/IDs in a row, the more likely it is an established community, and hence indicative of an interest of the members. An example of this output file format is illustrated in FIG. 1(g).

One potential difficulty when working with a relatively large graph and the BigCLAM process is the amount of processing resources and the speed at which the graph can be traversed and analyzed. As this amount of resources and processing time may not be realistic for many uses, the inventors chose to only consider symmetric relationships between nodes (at least for a first approach, which may be subject to modification in other embodiments). This limitation also provides the following benefits or advantages:

they help ensure mutual similarity of bloggers and do not include some possible recommendations (such as where a smaller account or a niche account might recommend a much larger one, and the much larger would not be expected to recommend the smaller one);

the number of nodes and edges in a graph is reduced, often by a factor of 10 or more (as suggested by benchmarking conducted by the inventors). The calculation itself is sped up in a corresponding manner;

social network recommendations consist of several steps: similar content recommendations, personal recommendations, and random recommendations. For an initial approach, the embodiments considered only the first type, which is obtained by taking the symmetric relationships between nodes.

In addition, another technique that has been found to be useful is naive graph edge recovery, a technique that operates to artificially increase the number of symmetric edges. The restoration of symmetric edges occurs after clustering—as an example, take a cluster from the symmetric graph, go back to the full graph, and if there are bloggers (or other actors) that are recommended for more than 0.6-0.7 (i.e., 60 to 70%) of the accounts of this cluster, then draw a new edge (which the process apparently did not identify because it did not reach these bloggers/sources during the social network traversal). As a result of experimentation by the inventors, it turned out advantageous to consider additional edges in the graph, and to consider them as symmetric.

In some embodiments, the result of iteratively applying a social network's internal recommendation system may require "pruning" prior to being used in subsequent stages of the disclosed and/or described approach. This may be desirable because the network's recommendation system considered different factors and/or a different decision process when deciding whether to recommend an account to a user.

For example, Instagram's recommendation system consists of several parts. It has a part that recommends things that expand a particular interest, and a part suggesting large accounts that are popular. By comparison, Twitter's recommendation system consists only of accounts that are "close" in meaning or content.

When adding new edges using the symmetric edge recovery algorithm, for the Instagram graph and due to the behavior described, large accounts become part of all interests. This may produce an extremely large set of edges which require pruning to be of use. In contrast, using the Twitter recommendation process does not cause this type of concern.

As one non-limiting example, Netflix is part of many communities in the Instagram social network graph because it is part of the list of popular accounts, rather than being relevant to each community. When reconstructing the edges, Netflix, being at the intersection of the set of communities, gets a set of edges. But this does not always lead to a correct or useful result. Therefore, this approach is best implemented qualitatively on Twitter. If an account from Twitter or Instagram falls into multiple categories, then in one embodiment, the disclosed and/or described process chooses the level at which the categories should be pruned.

Further, within each community, there is an average level of connectivity between nodes/accounts. If there are accounts (nodes) that fall outside of a range around the average value, in one embodiment those may be considered outliers and ignored or removed from further consideration. This is based on a heuristic, i.e., it is hypothesized that once in a community, a popular account such as Apple music becomes relatively uninformative based on its high level of connectivity compared to other accounts. This is explained by the fact that it is in the set of accounts recommended by multiple other communities.

In one embodiment, choosing an appropriate threshold for selecting outlier accounts or those that may be disregarded can be performed as follows. Count the degrees of the nodes[6] of bloggers (as example accounts) in the cluster and take the 90th percentile. This serves to reject obvious "tails" in the distribution, as when there are large bloggers in the cluster of the symmetric graph, but the blogging is directed to the correct topic(s).

[6] In graph theory, the degree of a vertex is the number of edges connected to it. Degree distribution is a probability distribution of the degrees of vertices in a graph. It is an important measure to analyze various properties of a graph, such as its robustness and connectivity.

Next, compare the degrees of the candidate bloggers to this percentile value. If the ratio of the cluster percentile to the degree of the candidate blogger is greater than 0.2 (that is, the degrees are +-comparable, where 0.2 is a hyperparameter which defines the trade-off between accuracy and quantity of new bloggers added to the cluster), then add the blogger (node) to this cluster, which means adding the blogger's corresponding edges to the symmetric graph. If less, i.e., the degree of the blogger is more than 5 times the percentile of the cluster, then reject the blogger (node) for the graph. As an example, take 90% of all accounts in a community that are less than number X, where X stands for the degree. Now compare/divide degree of the candidate by the value of X. if it is more than 1 (as an example, at the end we take 5), then it may be a popular account.

Next, the process flow determines the relative significance or meaningfulness of each identified community. This can be interpreted as a measure of the validity of the designation of the group as a community having a common interest. As mentioned, in one embodiment, this is accomplished by use of the CRank method or technique for prioritization (contained in the SNAP library).

CRank is designed to automatically evaluate and rank each identified community based on the structure of the network graph in a region around a set of nodes; for example, the higher the value, the "better" or more valid the identification of the group of nodes as a community. FIG. 1(b) is an illustration of the application of CRank to a set of potential groupings of nodes in a network graph to identify a set of nodes most likely to represent a valid group and is described in greater detail herein.

As an example of using CRank, for the program input, the previously found communities are provided and for each, the program calculates one or more prioritization metrics. In one embodiment, four characteristics or data representing likelihood, density, boundary, and allegiance for the network graph are used as the metrics. The results of these metrics are aggregated for a graph and used to rank or prioritize the graphs, and hence the (sub)networks that represent the communities.

The disclosed set of processing steps or stages in CRank may be used to "score" each of several (sub)networks/communities to identify those of potentially higher relevance or confidence that the set of nodes do form a group with a common interest. Human (or automated) review of the prioritized results and scores may be used to evaluate the results and select one or more communities that are believed to represent a valid interest of a person (who is represented by a node in the community network).[7]

[7] Further information regarding Crank and its use and approach may be found in the following article: http://snap.stanford.edu/crank/.

After identifying a community or grouping that appears to be a valid representation of a person's interests, posts of text or images (or other posted content) of bloggers from a community may be analyzed to determine the subject of the interest or interests. This may involve human review and annotating and/or generating embeddings or other representations of posted content to identify subject matter (such as by using a similarity measure or programmatic labeling).

In one embodiment, a Word2vec model was constructed based on several million posts found in the Instagram social network. A 2-dimensional representation of the model was then built using the t-SNE algorithm[8]. The t-SNE algorithm was used to help define the most common interests, while Word2vec helped in building a hierarchy using the Word2vec distance between words. For analysis of images, in one embodiment, Retinanet[9] was used to find custom audiences, by analyzing images and pictures from posts.

[8] t-SNE (tsne) is an algorithm for dimensionality reduction that is well-suited to visualizing high-dimensional data. The name stands for t-distributed Stochastic Neighbor Embedding. The idea is to embed high-dimensional points in low dimensions in a way that respects similarities between points. Nearby points in the high-dimensional space correspond to nearby embedded low-dimensional points, and distant points in high-dimensional space correspond to distant embedded low-dimensional points. MathWorks.
[9] https://developers.arcgis.com/python/guide/how-retinanet-works/.

An alternative approach for labeling a group or community involves use of a generative technique, such as a version of GPT or another generative technique or LLM. The symmetric recommendation graph produced using the social network recommendation process (with selective pruning applied if necessary) is clustered or evaluated using BigCLAM, resulting in identifying potential communities or groups of nodes having what are believed to be a similar interest or interests.

To generate a description of a cluster and a correspondence between one or more common interests and each blogger (node) in the cluster, an embodiment of the disclosed and/or described process determines the topics (interests) within the cluster using the description of the bloggers' accounts (in the case of Instagram, this may also or instead occur using the "business category" associated with an account).

A cluster doesn't have to be described by a single interest and the cluster can be divided into subgroups based on further refinement of possible interests. This may create a problem with large accounts, such as Apple music (which falls into hundreds of clusters at once), but this problem may be addressed separately.

In one embodiment, each cluster of bloggers (nodes) is provided as input to GPT3-turbo to identify subgroups within the cluster and to "name" (tag) these subgroups by at most three interests describing the subgroup. For example, one or more of a list of bloggers, their nicknames, names, descriptions, or business category (if available) are used as an input, and the output divides these bloggers into subgroups, with each subgroup labeled with the top 3 interests.

If a blogger lacks an intelligible description, they may be placed into one of the subgroups through analogy with their neighbors, or they may not fall into a subgroup at all (as may occur absent sufficient certainty about that blogger's proper category). BigCLAM clusters create a generalization property for a group of bloggers/nodes, so that further subgrouping via GPT3 (or other generative technique, as an example) is easier and more accurate than working with a random set of bloggers.

Since the input-output of the GPT model is limited by the number of tokens, the bloggers in the cluster are pruned and fed into GPT in batches so that the initial prompt together with the descriptions/nicknames/names/categories of bloggers fit within the allowed number of query tokens.

In one example implementation, the process flow takes bloggers (nodes) in groups of 15, as they are guaranteed to satisfy the allowed number of tokens based on the maximum length of descriptions. There are long descriptors and short descriptors. A batch is matched to the number of tokens, with 4096 being the maximum length of the model input. The output of this approach is a table of bloggers with their corresponding interests, where the interests may come from different clusters for the same blogger. The interests of the same blogger from different clusters may mean the same thing but be expressed differently, or they may reflect a variety of blogger topics. For accounts such as Apple music, which are tagged with hundreds of categories at once, re-tagging may be done with a limit on the number of categories that should be used.

As a non-limiting example, the instructions/prompt provided to a generative technique or model might be expressed as the following:

You will be provided with a cluster of Twitter bloggers with their username, name, location, and profile description. These bloggers may have interconnected interests and themes in common and for which they are influential together, or these accounts might be not influential at all.

Some interests might not be complimentary with others. Sometimes, people write random or neutral material for their description in a Twitter profile or even keep it empty—in this situation it is impossible to determine the interests and preferences judging by their Twitter profile. However, if such person with a random or empty description is present in the same cluster with accounts who have identifiable interests, then that person is assumed to probably have the same interest(s).

For each blogger in a cluster, there is a "Username", "Full name", "Location" and "Description"—all written respectively in quotes. Based on that information, determine and summarize common interests or topics of influence for each blogger.

If bloggers (nodes) separate into interest groups depending on a difference between an entire cluster's interests, divide that group inside of the output (for instance, assume a cluster is not accurately determined and N interests end up assigned to one cluster; in this situation, the approach should split the cluster into multiple (M) parts). All bloggers (nodes) in a particular group should be associated with one or more output labels or interests. Some bloggers might not be included into any group. Each output interest should be expressed and represented by 2-3 English words.

Difficult and specific terms should be provided to describe an interest, including a general category (e.g., sports teams should be written with the sport type). Do not use local languages to describe interests. The common interest may be estimated based on the languages and locations of blogger profiles.

Provide the output in a structured parse-able format containing no more than the top 3 common interests (this value (3) is used as an example but has been found to be efficient) for each group of bloggers in a cluster based on a group popularity score ranging from 0.0 to 1.0. The top of group interests may consist of between zero and three items. As a non-limiting example, the output may have the form:

\n\nOUTPUT FORMAT:\n"Group 1: username1, username2, username4, . . . \n\nCommon interests: \n1. interest1, score1\n2. interest2, score2\n3. interest3, score3\n\nGroup 2: username2, username3, username6, . . . \n\n . . . \n\nCommon interests: \n1. interest1, score1\n2. interest2, score2\n3. interest3, score3 . . . .

To take into consideration the number of interests associated with each account, in one embodiment, a weighting system was implemented which assigns a weight equal to "1/number of interests" to each interest of an account. As a result, when calculating the interest(s) for a person/account, the process considers how specific the account that identifies the person is, and the more specific it is, the more weight is given to it.

As an example, assume Netflix has been defined by the process as a business, movie, culture, and IT. That means it is associated with four different possible interests. Therefore, a final weighting of such an account by interest(s) would be ¼, as it's not specific enough. Now consider the actor Anthony Hopkins, who is found in the category of movies and memes. In this example, his weight for each interest will be ½. In this example, when counting a person's interest in movies who follows Netflix and Anthony Hopkins, the process will add these two weighting factors, ¼+½=¾.

This normalization process enables a better comparison of people's interests with each other. As a result, someone who follows a lot of large but non-specific accounts may have the same interest(s) as those who follow a couple of accounts that have a small number of followers but show a depth of interest and are more specific in their description/label.

In one embodiment, the weights of interest can be used to calculate a measure of affinity (this provides a measure of how much a selected category is specific to or concentrated in a target audience compared to a general audience). For example, dividing a user's interest share by the average share of the universe sample is useful and may be sufficiently accurate if two conditions are met; the sample is large enough and zero shares are not considered. The sample size is an attempt to fulfill the law of large numbers (LLN), so that at least such average shares of interest will converge in probability to the expectation value(s).

The approach counts these average shares for people who have the interest in question, at least in some proportion.

Thus, the approach (in at least one embodiment) does not consider the general population, but the population of people associated with a particular interest (as this increases the probability of the same distribution of random variables, if one considers a social network user as a random variable, which is necessary for assumption of the LLN).

Using this approach, weighting each interest is relatively straightforward. As an example, for a table with a taxonomy (user_id, interest) the weights may be obtained by the following query:

SELECT user_id, interest from twitter_tax
INNER JOIN (SELECT user_id, 1/count(distinct interest) as weight from twitter_tax GROUP BY user_id)
USING user_id This form of table may be used as the primary taxonomy. The share of interest in the user's subscriptions (numerator) then takes the form:

"the sum of weights of one interest on different bloggers"/ "the whole sum of weights of subscriptions"

The denominator, relative to which we consider the expression of interest, i.e., the average share of interest for all interested people may be determined as follows:

select interest, AVG(interest_share) from (select account_id, interest_sum/interest_all as interest_share from
(select account_id, interest, SUM(weight) as interest_sum from twitter_followings as a
INNER JOIN twitter_tax_weights as b
ON a.following_id=b.user_id
GROUP BY account_id, interest)
INNER JOIN (select account_id, SUM(weight) as interest_all from twitter_followings as a INNER JOIN twitter_tax_weights as b
ON a.following_id=b.user_id
GROUP BY account_id)
USING account_id)
GROUP BY interest As mentioned, Instagram is provided as a non-limiting example to demonstrate implementation of the disclosed and/or described techniques. The disclosed methodology can be applied to other existing and future social networks having similar user attributes and structure: i.e., an ability to construct a graph representing accounts and connections to other accounts, and posted content containing text, images, pictures, or videos. A social graph analysis method is applied to assign one or more theme(s) (topics of interest) to a set of accounts using one or more of the methods disclosed and/or described herein.

In one embodiment, to generate a report for a specific account/user, the process accesses a graph of that account's "followings" (what they follow) and then determines one or more respective themes (interests) associated with each username/account from the user's social network graph or mapping. This information can be processed to develop a hierarchy of interests (or a form of indicating the relative strength of each possible interest) for the user who is the subject of the evaluation. That information can be used to infer or determine a risk or concern associated with the user based on their interests as indicated by their social network activity.

In general, an embodiment first collects information on many social media or network accounts (in some cases, hundreds of millions of accounts) and assigns each (or each cluster or grouping of accounts) a theme or interest as disclosed and/or described herein.

At this stage, the disclosed and/or described processes have identified a person's posts of content, comments, indications of likes, or other social media activity across multiple social networks, performed network analysis to identify communities or groups that the person associated with, and determined an interest or subject represented by each community or group.

In some embodiments, the process flow then determines a measure of the impact of that person's interactions with the communities of which they are a part. This may be used to determine the opinion or thought leaders of a community, and more specifically, whether a particular person is an opinion leader (as that may indicate a stronger interest in a subject or support for a position). Further, using keywords found in posts related to an interest, a hierarchy of interests of a community or group may be constructed. This may be helpful in more accurately identifying the primary interest(s) of a member of that community.

In one embodiment, an opinion leader (i.e., a person with a stronger influence on the opinions of others in a group, or whose opinions are more likely to be representative of the group) may be identified by the following process flow:

Manually select several profiles within a group—these can be selected to represent the "core" or central members of a group or community;
the arrangement of nodes within a group and/or density of edges connected to a node may be used to suggest possible core members (e.g., those having a greater than average number of connections/edges and/or being a source of a greater than average number of posts of content or other actions within the group);
Determine a sub-group representing the intersection of followers of the selected "core" profiles—these represent a set of people who are likely very interested (at least in a relative sense) in the primary topic or subject of the group;
Next, identify new people who are followed by the determined sub-group (the very interested people);
Add these newly identified people to the initially selected core or central group and repeat until the members of the core group stabilize or appear to change relatively slowly.

The resulting members of the core group may be considered the opinion leaders or people most influential within the group (as well as those having a relatively strong interest in the primary topic or subject of the group).

In some embodiments, a hierarchy or the relative importance of multiple interests may be generated for a person/account. In one example embodiment, to construct a hierarchy of interests the following process was implemented:[10]

[10] Topical modeling may provide an identification of the underlying interests of a person or group through text analysis. However, an alternative to this approach is to manually highlight the underlying interests that should be in a taxonomy. In addition to the base (or primary) interests, specific interests may be identified using the constructed graph, although it is not certain how these interests relate to the base interest. One approach is to isolate the most frequent words appearing in discussions of a given topic and input them to word2vec (or a similar embedding technique) for processing. A word2vec processing flow may be constructed based on a large set of Instagram posts (or those of another social network). This is a multidimensional vector language space where similar words (e.g., synonyms) are adjacent to each other. The word2vec model allows one to input a word and find out what other words are "close" to or "similar" to that word. Typically, it is assumed that if the basic topic words and specific topic words are "close", then they are related. This approach can be used to identify the proximity of specific or narrower interests to a more basic or foundational interest.

Identify a set of N general interests that it is desired to supplement with additional, more specialized (or narrower) interests;
Collect the main keywords that characterize and describe the N interests;
Take the groups of interests identified in the previous steps and calculate the average distance from the posts/ content included in this group to the characteristic words. The closer the distance, the greater the probability that the interest/post relates to the general group.

Once a person's interest or interests are determined that information may be used in one or more ways to assist in making an informed decision regarding membership, employment, providing a service, reputational or brand risk, or other form of associating with the person. As non-limiting examples, such a decision may include:

Performing a social media background check when hiring, including private hires such as nannies, babysitters, care givers, caretakers, pet walkers, house sitters, or housekeepers;

Performing a social media background check on potential business or personal partners, tenants, public figures, or someone else of interest;

The results of the social media background check may be used to identify potential "red flags", i.e., undesirable and/or potentially harmful interests such as drugs, weapons, association or interest in extreme groups or organizations, or mental health issues, as non-limiting examples;

The list of potential red flags or interests of concern varies and may depend on the context, use or purpose of the background check, or situation in which the person being evaluated would function;

For example, an above median interest in luxury goods may be considered a red flag for a landlord who is renting out relatively inexpensive housing by suggesting a tenant may be living beyond their means;

The background check may be used to avoid hiring or otherwise engaging with a potentially harmful person and/or to regularly monitor a person of interest to provide an indication of an emerging problem or concern (such as posts or comments in response to a recent event);

Suggesting whether a person is a good fit for a certain group of people;

For example, if everyone in the group has a similar political or other interest, it may be harmful to put a person with opposing interests in the same group (as this may adversely impact group cohesion or productivity).

Figure 1B:
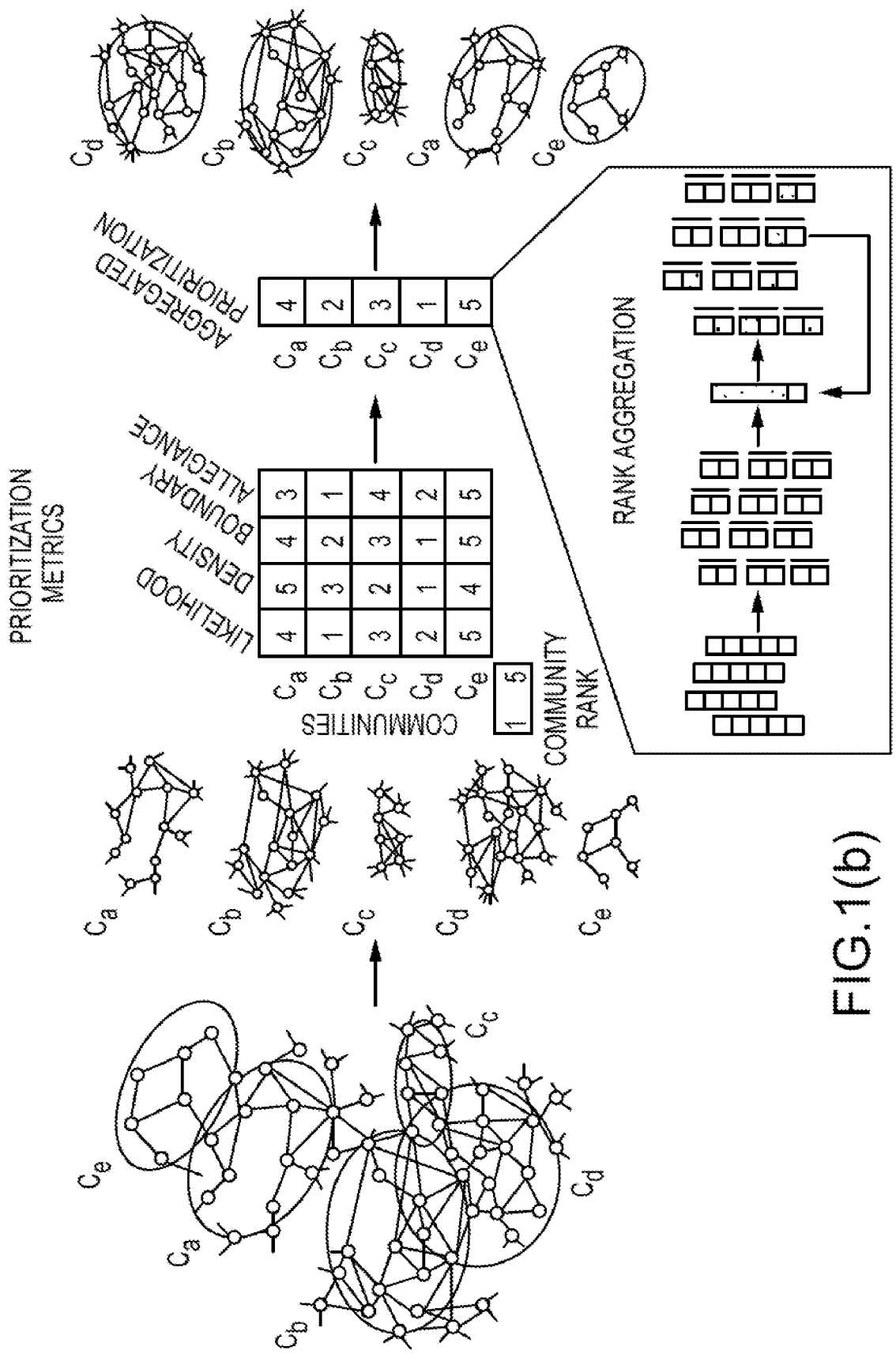
FIG. 1(b) is an illustration of the application of CRank to a set of potential groupings of nodes in a network graph to identify a set of nodes most likely to represent a valid group.
Figure 1C:
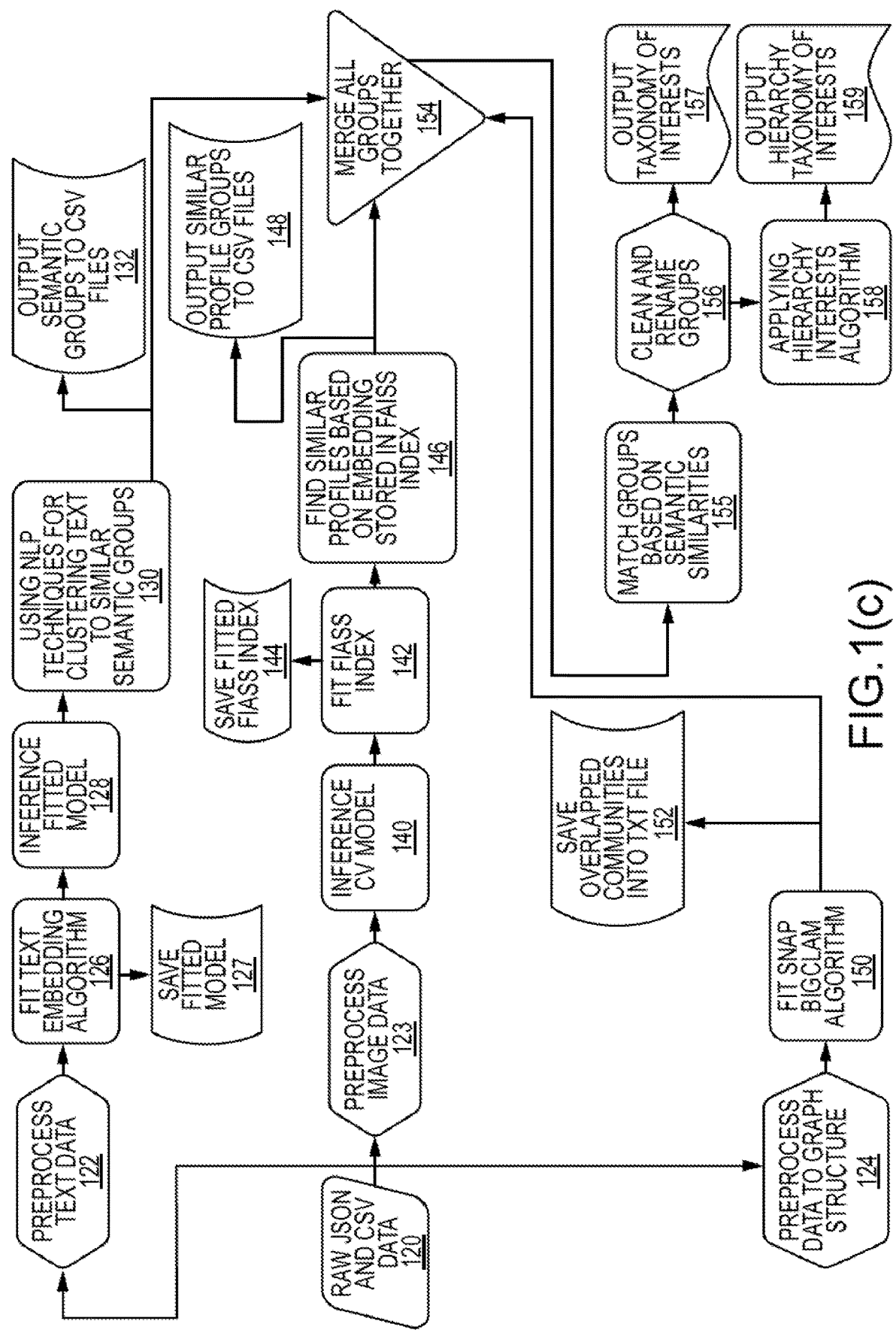
FIG. 1(c) is a flowchart or flow diagram illustrating a set of steps, stages, functions, operations, or processes that may be implemented in an embodiment of the disclosure.
Figure 1D:
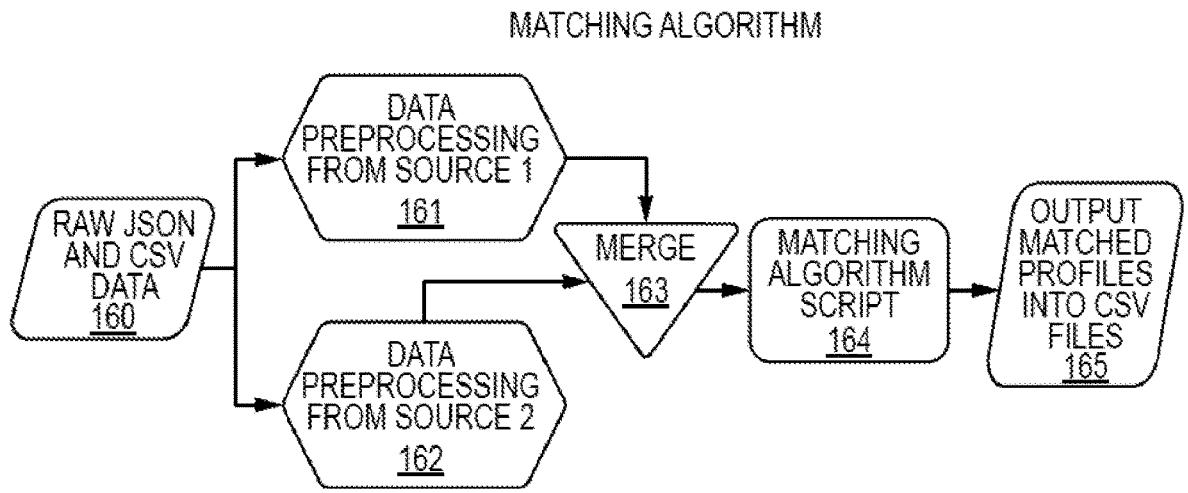
FIG. 1(d) is a flowchart or flow diagram illustrating an example of a matching algorithm or process flow that may be incorporated in an embodiment of the disclosure.
Figure 1E:
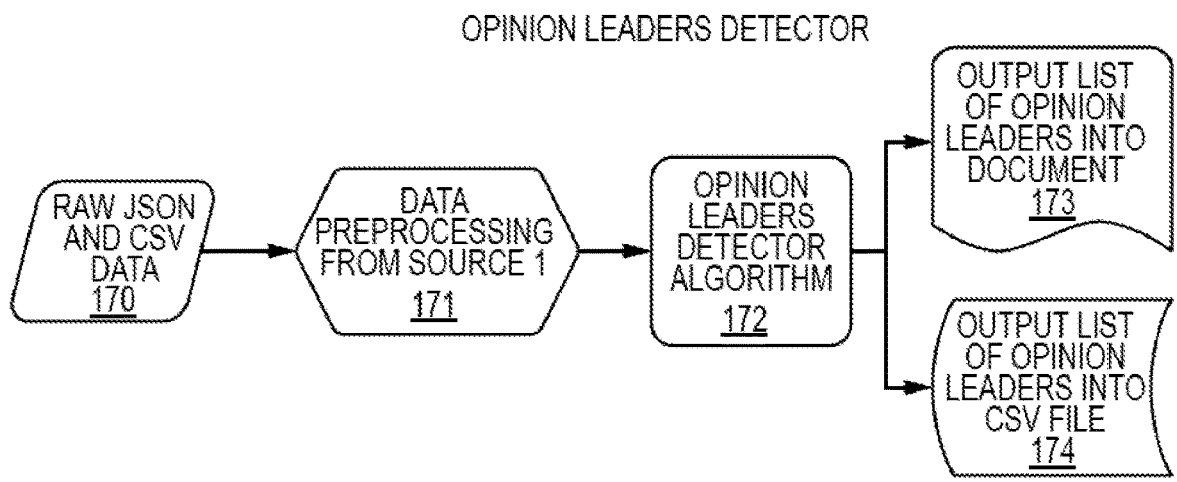
FIG. 1(e) is a flowchart or flow diagram illustrating an example of an algorithm or process flow for identifying an opinion leader that may be incorporated in an embodiment of the disclosure.
Figure 1F:
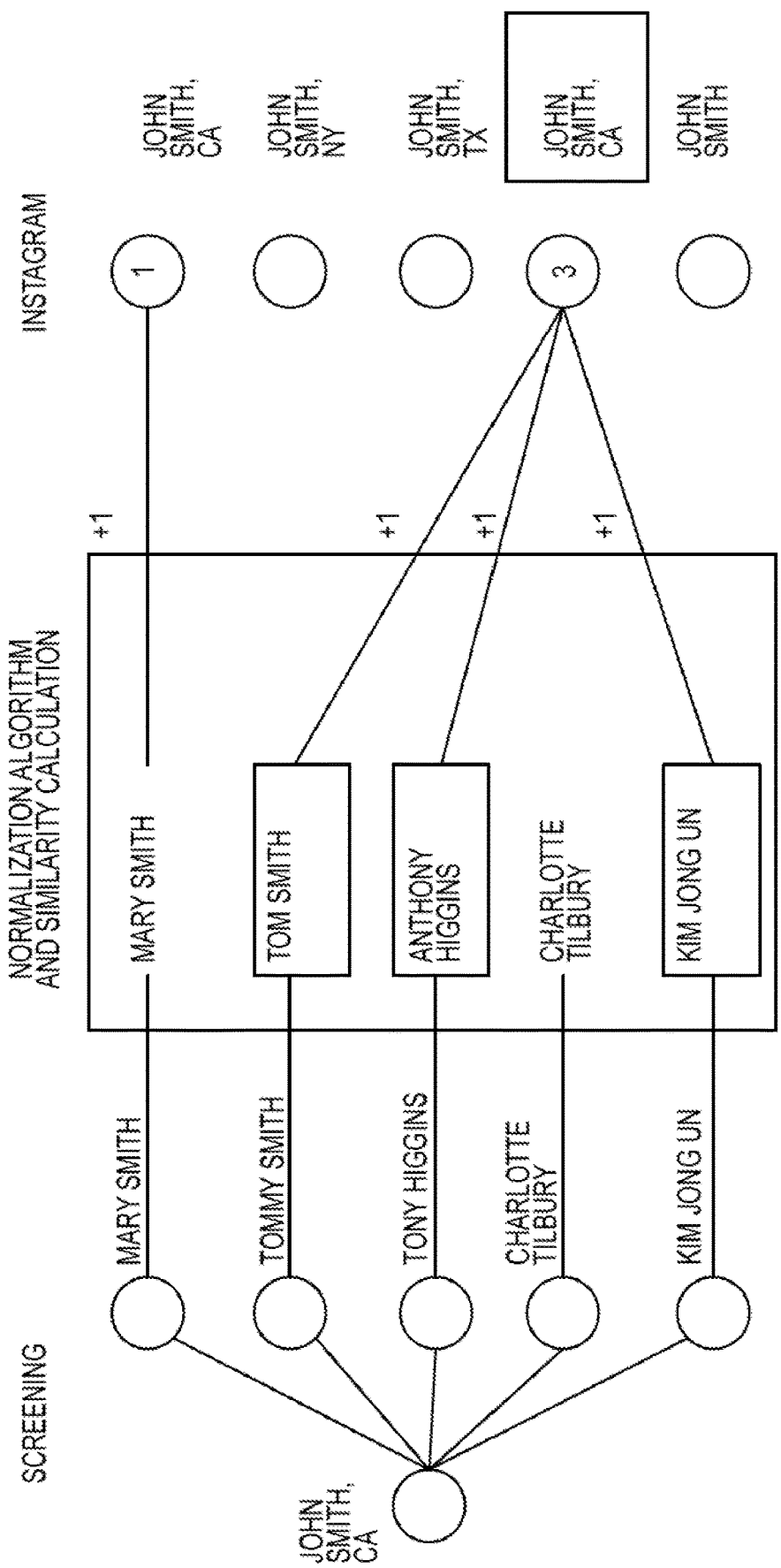
FIG. 1(f) is a flowchart or flow diagram illustrating an example of an algorithm or process flow for resolving ambiguity presented by multiple accounts that are associated with a person having the same (common) name (such as John Smith)

FIG. 1(a) is a flow chart or flow diagram illustrating a method, process, operation, or set of functions 100 that may be used in implementing an embodiment of the disclosure:

Access One or More Social Network(s) and For Each Use Network Recommendation Process to Generate Map of Accounts in Network with Similar Interests to Another Network Account (e.g., Instagram, Twitter, Facebook, or TikTok) (as suggested by step or stage 102);

Identify a recommendation or similar process for generating an account or content that might be of interest to a specific account or member of the network;

The recommendation process is used as a starting point to generate a "map" of accounts (nodes and connections), identify clusters or groupings of accounts, and label the interest associated with a group or cluster, where it is assumed that nodes/accounts in an identified cluster have a similar or related interest;

As an example, an account on a social network platform may be identified (such as a known blogger) and a recommendation function or feature used to generate one or more accounts that the social network expects might be of interest or contain common content to the identified account—this process may be continued iteratively to construct a "map" of a set of accounts in the social network that have some relationship to others in the map;

In effect, the mapping process begins with an account, generates nodes expected to be related to or representative of accounts having a similar interest or content, and then continues with each new node in the same manner to develop the overall network mapping or graph;

The recommendation process implemented by a social network is typically implemented using network specific machine learning or other form of algorithm. It's not required or always the case that it follows a specific step-by-step process to generate the recommendations, as it may process matrices which contain all accounts;

Identify Groups or Clusters of Accounts Based on the Recommendation Process (step or stage 103);

The network mapping or graph showing connections or relationships (edges) between a set of accounts (nodes) may be used to identify clusters or groupings of accounts belonging to users/accounts expected to have a similar interest;

For example, by using the BigCLAM and/or CRank process flows described herein;

This may include identifying connections, a similarity, or relationships between accounts based on indications of one account following another and/or demonstrating interest in content associated with another account (such as by posting content or commenting on posted content);

The interests or topics associated with an account or group of accounts may then be determined using techniques such as natural language processing, natural language understanding, image processing, name recognition, or other suitable technique (as suggested by step or stage 104);

In some embodiments, the common interest may be determined by recognition of a keyword, object, or other form of a topic of the content posted by members of the identified group or cluster;

For a specific person of interest (i.e., the one whose interests and/or risk are being evaluated), identify one or more social network accounts associated with the person (as suggested by step or stage 106);

This assists in aggregating the person's social network and social media interactions and activities across accounts in different networks or accessed through different applications;

In one embodiment, a "matching" algorithm or sequence of steps may be used to identify what is believed to be the same person in different networks, typically as indicated by a different account name in a different network or when using a different application;

The matching function may be based on an overlap of friends or contacts associated with a person in different networks, suggesting that the person in the two networks is the same person, although using a different name or identifier in the two networks;

A possible approach that may be used to determine if a person with the same or similar name (e.g., John Smith) in different networks is the same person for purposes of the evaluation is described herein with reference to FIG. 1(f);

Aggregate Data and Information Associated with Specific Person's Activities and Interactions from the Identified Social Network Accounts (as suggested by step or stage 108);
  This provides a fuller and more complete "picture" of the person's social network and social media interactions and activities;
Using One or More Network Mappings or Graphs, Determine the Specific Person's Interests Based on the Aggregated Data and Information (as suggested by step or stage 110);
  Determine one or more groups or clusters of users/accounts the person may be associated with in each social network;
    This may be done by using the network's intrinsic recommendation function or feature to find other accounts (nodes) in the network map or graph that are suggested to the account representing the person, and finding a group or cluster to which the recommend accounts belong;
  In one embodiment, this may be based on text and images the person posts or engages with, such as by commenting upon or upvoting;
  In one embodiment, an interest may be determined based on analysis of the described map or network graph representing a set of accounts that form a community having a common interest (typically as indicated by common topics of discussion, "likes", posted content, or other indications of a common interest);
    As described, an interest or topic may be associated with a group or cluster of users that belong to a social network—this information may be used to determine one or more likely interests of a specific person by identifying groups or clusters with which they are associated and/or to which they are recommended, and the topic or interest associated with that group or cluster;
      In one embodiment, a vector representation of an image and/or text may be generated for one or more of a person's interactions with social media using an embedding technique or other suitable method;
      For example, an embedding of text may be generated using a suitable NLP technique, or an image may be processed using a convolutional neural network or other image processing technique;
    The generated vector representation(s) may be indexed and encoded to assist with efficient searching for "similar" posts, content, or images;
      The identified "similar" posts, content, or images may then be used as a "key" to identify accounts (and then groups and topics of interest) that are believed similar to, or representative of a person's interests;
  In one embodiment, a person's "followings" (the topics or accounts a particular person follows, as represented by a "followings" graph of nodes and edges) may be used as part of identifying the person's interests, with the application of one or more applicable naming techniques to the nodes or a set of nodes;
  The nodes are not limited to people, and may represent almost any type of account, including personal accounts (people), business accounts, non-profit organization accounts, non-incorporated groups accounts (e.g., a cat lovers group Instagram account), or a fan group account, as non-limiting examples—each of these may provide clues as to a person's interests;
Determine If the Specific Person Is an Opinion Leader in a Group Directed to One of Their Interests (optional) (as suggested by step or stage 112);
  This may assist in evaluating the risk posed by the person due to their possible influence on others in a group;
  Further, identifying an opinion leader in a group (whether the person of interest or another) may assist in determining the interest of the group based on the opinion leader's posts or activities (such as attending a conference or posting an image);
Construct a Hierarchy of the Specific Person's Interests (optional) (as suggested by step or stage 114);
  This may provide an indication of the relative strength of the person's interests and/or the likelihood of them acting on those interests or becoming further involved with others having a similar interest in the same or another group;
  This may also provide an indication of a related interest or group the person participates in or may become involved with;
Based on the Specific Person's Interests and Opinion Leader and Hierarchy Evaluation (if performed), Determine if Person Represents a Risk or Concern (as suggested by step or stage 116);
  This may be based on a particular interest, a range or set of interests, a particular activity or post by the person or others in a group, as non-limiting examples;
  The type of risk or concern may vary and include one or more of employment, financial, physical risk to themselves or others, or reputational risk to an employer or other person, as non-limiting examples;
    Identifying the type of risk and/or the degree of risk, followed by deciding if the person represents a sufficient risk to take an action may depend on a ruleset, trained model, statistical evaluation, or other applicable methodology (as suggested by step or stage 118);
    In one embodiment, the user of the disclosed and/or described process may select or identify interests of concern and if the person being evaluated is found to have that interest (or a sufficiently strong enough interest), then an alert may be generated;
    In one embodiment, one or more interests that should be of concern may be determined by examination of previously generated employment or HR data;
      In this embodiment, prior employment data could be used to identify employees having short periods of employment or a concerning employment history, followed by examining their social network activities and interests—if there is a common set of interests these persons have and that are not found in other employees, then this may be indicative of an interest to flag as potentially concerning.
  Note that the described approaches may be applied to a single or to multiple social networks to construct a map/graph of each network. Further, the data and information about a specific person (the one whose interest are being determined) may be obtained from one or from multiple social networks. The data and information from a single social network or aggregated from multiple ones may be used as "inputs" to the processes that use that information to determine the person's interests based on a map of a specific social network.

As a non-limiting example, if Instagram is used to generate a map/graph and the person of interest has an Instagram account, only that information may be used, along with the constructed map/graph of Instagram. If the person of interest has multiple social network accounts, such as Instagram and TikTok, then the aggregated information may be used from (or with) both a TikTok map and Instagram map to determine possible interests. Similarly, the Instagram information about the person (or that from one or more other social networks) may be used to determine possible interests based on a different social network's map (and similarly for other social networks).

As mentioned, FIG. 1(b) is a diagram illustrating an application of the CRank process to prioritize the likelihood that a set of nodes corresponding to accounts represent a valid group for purposes of further analysis. In one embodiment, this is done in cases where the number of clusters after use of BigCLAM would necessitate a greater amount of computing resources than is desirable to allocate, and a form of prioritization or filtering is desired to produce a more efficient processing flow.

CRank provides a form of prioritization by identifying those groups of nodes/accounts (clusters/communities) that are the most promising candidates for further investigation or analysis. In one sense, CRank ranks an identified set of clusters based on network characteristics or structure. It does this by evaluating four specific structural features of a network of nodes (termed, likelihood (likelihood of edges), density (internal connectivity), boundary (external connectivity), and allegiance (relationship with rest of network)). CRank then applies a rank aggregation method to combine the individual structure metrics to produce a final ranking metric(s). The specified metrics characterize network connectivity features for each cluster/community by evaluating the magnitude of structural features and robustness against noise in the network.[11]

[11] See https://www.nature.com/articles/s41467-018-04948-5 for the entire text from which this paragraph is taken or which serves as the basis for the paraphrasing in this document.

FIG. 1(c) is a flowchart or flow diagram illustrating a set of steps, stages, functions, operations, or processes that may be implemented in an embodiment of the disclosure. As shown in the figure, in one example embodiment, the following steps or stages may occur:

Input data (as suggested by step or stage 120)
  This represents an entry point for the following process flow—as non-limiting examples, the initial data may be in the form of JSON and/or CSV data;
  Since there are three possible data formats in this example (i.e., text, images, and graph), the processing follows three streams (as suggested by process branches 122 (for text), 123 (for image data), and 124 (for graph data) in the figure;
Preprocess text data (as suggested by step or stage 122 in the figure);
  Preprocessing of input text data may include one or more of splitting text into tokens, removing rare tokens, removing or interpreting emojis, or reducing words to their normal form;
Fit Processed Text Data to NLP embedding model (as suggested by step or stage 126);
  In one embodiment, this was a word2vec model based on several million posts from Instagram;
  The fitted model is then stored in binary data format (as suggested by step or stage 127);
Inference model (as suggested by step or stage 128);
  The fitted model is then used to generate a prediction or inference for new input text data. In one embodiment, the fitted model may be as follows;
    Extract the word vectors (embeddings) for the words one is interested in. The vectors are numerical representations of words in a high(er)-dimensional space;
    Preprocessing—apply one or more of stopwords removal, adjustment to lowercase, unicode encoding, and/or lemmatization, as examples. An input for a word2vec model is one word from a dictionary. The output is a vector of dimension 256 (as an example). For a sentence of n words, one would obtain n vectors. The n vectors might be averaged, in order to one mean vector of the same dimensionality representing the sentence;
    Based on the discussion regarding t-SNE, it is words/sentences that are clustered, so at the time of inference, a descriptor is inherited from the descriptor-trained model;
Clustering Text into Similar Semantic Groups (as suggested by step or stage 130);
  In one embodiment, this includes use of a 2-dimensional representation of the groups using the t-SNE algorithm. T-SNE helps to define the most common interests manually, while word2vec helps to build a hierarchy using the word2vec "distance" between words;
  T-SNE may be used to determine how many "large" clusters are present. After that, the process may use DBSCAN clustering and then select the ones to be used;
  As an example, in some uses of the disclosed and/or described approach, the result is approximately 50 large clusters that are detached from the others and can be manually labeled;
Output Text Semantic Groups/Clusters (as suggested by step or stage 132);
  At this stage the processing saves the result after determining/obtaining the interest associated with a cluster based on the text data;
Preprocess image data (as suggested by step or stage 123 in the figure). An example of a suitable image processing flow is the following:
  Each image (e.g., profile picture, post picture, or banner, as non-limiting examples) is processed by a face detection algorithm using Histogram of Oriented Gradients (HOG). This algorithm is a fast way to detect faces within a large amount of data using CPU parallelized computations;
  After the detection with HOG, each face is cropped out of the original image and saved as a new JPEG file;
  For each face image, an embedding is produced using the model ArcFace. The output is a 512-dimensional floating-point vector which is a projection of the person's face into a multidimensional vector space, such that close vectors in that space correspond to "similar" human faces. For the vectors' distance computation, a cosine distance metric may be used;
  At the end of the processing the vectorized faces are stored in a vector search database using a FAISS Index built using a process of "reprojecting" the initial vector dataset into an optimized vector space:

For n vectors in that index, sqrt(n) centroids are produced;

Each centroid is a real vector present in the dataset, but with the property of being similar to sqrt(n) other vectors from the dataset;

Thus, the dataset of n vectors is rebuilt into sqrt(n) representative centroid vectors with corresponding sqrt(n) similar vectors for each centroid (sqrt(n)×sqrt(n)=n);

During the search for a new vector, the process selects m<sqrt(n) centroids which are the most similar to an input vector. Next, the process checks the similarity between the input vector and each vector inside the cluster(s) corresponding to centroid(s) to produce the final ordered list of the k most "similar" vectors:

Inference Computer Vision Model (as suggested by step or stage 140);

In one embodiment, the Retinanet model[12] is used to analyze pictures from a post;

A neural network may be used if the interest cannot be determined or identified in another suitable way;

[12] See https://developers.arcgis.com/python/guide/how-retinanet-works/.

Fit FAISS Index (as suggested by step or stage 142);

At this step or stage, a FAISS index is trained to be able to search for similar objects quickly and efficiently in a set of vectors;

Save FAISS Index (as suggested by step or stage 144);

At this step the trained index is saved, so that the process doesn't have to repeat this training each time;

Find Similar Objects (as suggested by step or stage 146);

Using the FAISS Index, the process can efficiently find vectors representing content of profiles who are passionate about a specific interest (e.g., special dog breeds or special car owners, as non-limiting examples);

Output Image Semantic Groups (as suggested by step or stage 148);

At this stage, the process saves the result after obtaining the interests based on the set of images;

Preprocess Graph Data (as suggested by step or stage 124);

In one embodiment, in this step, the process converts data in JSON format into a table of a list of edges, where one column is a list of vertices that are the source, and a second column is a list of vertices that are the destination. This produces an input file with a list of edges;

Fit SNAP BigCLAM Algorithm to Data (as suggested by step or stage 150);

As described, the underlying concept of this approach is that the more the two nodes share a common community, the more likely there is a connection between the two nodes;

Overlapping groups or communities are then saved into a text file (as suggested by step or stage 152);

In one embodiment, the CRank method of cluster prioritization was used to generate a rank for each potential community based on the structure of the network graph in a region of the possible cluster;

In one embodiment, as an input to CRank, the process provides the previously found communities, and for each of them it calculates one or more prioritization metrics (in one example, there are four such metrics). These metrics are aggregated to obtain an estimate that serves as a form of evaluating (sub)networks based on specific characteristics;

Next, the output of each of the three processing branches are merged or combined (as suggested by step or stage 154);

Match All Data (as suggested by step or stage 155);

In this step, the process matches the interests found from the data, so that the interests found are semantically similar (such as those found from text and graph, as an example);

(Re) Naming (as suggested by step or stage 156);

In this step, a human or programmatic labeling technique is used to provide a name for the interests found. For example, if data with text about extreme sports and mountains and the set of accounts about snowboarding and skiing came together in a community, then this process step or stage could be used to decide to name such a cluster as "Extreme Sports";

Output a Taxonomy of Interests Found from the Input Data (as suggested by step or stage 157);

Apply Suitable Algorithm to Determine a Hierarchy of Interests (as suggested by step or stage 158);

Output Hierarchy of Interests Taxonomy (as suggested by step or stage 159).

FIG. 1(d) is a flowchart or flow diagram illustrating an example of a matching algorithm or process flow that may be incorporated in an embodiment of the disclosure. As shown in the figure, in one embodiment, raw (that is unprocessed) JSON and/or CSV data is input to the process (as suggested by step or stage 160). The raw data is pre-processed as disclosed and/or described herein, with the pre-processing dependent in some examples on the source of the raw data (i.e., the social network or other source or depository of data), as suggested by steps or stages 161 and 162.

The pre-processed data is then merged or combined, as suggested by step or stage 163. Next, a matching algorithm, ruleset, trained model, or other suitable process is executed, as suggested by step or stage 164. The matched or otherwise associated data from the sources is then output as profiles associated with the same person but found in more than a single network or sources, as suggested by step or stage 165 (with the output represented as CSV files in this example).

As suggested by the figure, because in one embodiment the processing uses two data formats (graphs and images), the data is divided into two streams. For matching by name, the data is processed into a single format (normalization), so that the names are spelled the same, even though the sources of the names are different social networks.

For matching based on images, the process searches and crops the faces in photos to remove the background, followed by vectorization of faces using a computer vision (CV) algorithm (in one embodiment the CV algorithm used is custom built face recognition deep learning model, which is distributed under a MIT license). It receives an image as input and outputs a list of parameters, which may include one or more of gender, age, face alignment, or embeddings (where the embeddings may be used in a matching or similarity algorithm). Since the raw data is in JSON format or in CSV files, some pre-processing may be needed (for example, converting JSON to DataFrame format).

In one embodiment, the matching algorithm or processing applied may involve graph matching, in which it is assumed that if a person has the same names for friends in different social networks, then those friends may be the same people, and the person may be the same person but posting in two networks. Once the accounts believed to belong to the same person are combined into one persona, the process can be iteratively repeated.

As described, an improvement in automatic matching accuracy can be achieved by comparing social media graphs (e.g., follows) of a person of interest with a provided list(s) of relatives, colleagues, and neighbors because it is assumed that a person is likely to follow at least some of the same neighbors, colleagues, or relatives on all of their social media, even if the followings are in more than a single social network.

However, this approach may encounter a problem when a person has a relatively common name (this is referred to herein as the "John Smith" problem). This problem is addressed by the approach illustrated in FIG. 1(f). As part of addressing the John Smith problem or implementing a process to match names, it may be necessary to process identifier or name related data obtained from a network to normalize or otherwise prepare it for a matching process.

This form of processing may be needed because in a social network, a person's username or full name may be written in an arbitrary format. For example, the fields may contain extra words, first name only, last name only, or no name at all. For this reason, in one embodiment, a name is extracted first from the fullname field, then from the username field in order of priority, one step at a time as follows:
- Fullname is cleaned of stop words and popular neutral words that don't fall into popular names/surnames lists, brought to unicode encoding, lowercase(d), sorted alphabetically (to address the name=surname problem—Connor Smith/Smith Connor);
- If the fullname is empty, then parse username—e.g., AlexJones12/alex.jones12/Jones-alex12 becomes alex jones;
- For each name in the converted fullname/username a list of names is generated, e.g., for alexander it is alex, aleksander, aleksandr, for al it is alan, ali, allen, etc.;
- For the converted fullname and the name-analogs, a list of phonetic designations of the name is generated using the Metaphone algorithm;
- See (https://en.wikipedia.org/wiki/Metaphone);
- Subsequently, a name search is performed as follows:
    - first a full match on the original full name, then a match on the transformed full name, then a match via a name-analog, or a phonetic match;
    - Matching or similarity to a nickname may be used as an optional approach;
- This approach provides normalized names, but some of them may be completely the same. And that's what may present the John Smith problem, when a person with a common first and/or last name cannot be accurately identified in social networks due to the large number of possible matches.

The result shown in FIG. 1(f) indicates multiple John Smiths. All of them have the same normalized full name but only 2 of them are the same person. Using the disclosed/described method, one can determine the "correct" one with relatively high precision.

As described, in some embodiments, a matching algorithm or processing applied may involve image/picture matching. This form of matching may encounter several technical issues, including search speed and accuracy, the disk space required to store the data, or the amount of RAM memory required for processing. To address these issues, in one embodiment (and as referred to previously), the FAISS library was used.

FAISS (Facebook AI Similarity Search) enables an efficient search operation to be performed to identify the (k) nearest vectors to a specified vector, (x) (and hence indicate an expected degree of similarity). One aspect of FAISS is that of an index, which is a set of parameters and vectors. FAISS parameter sets can be completely different and depend on a user's needs. Vectors can remain unchanged, or they can be rebuilt. Some indexes are available for use as soon as vectors are added to them, and some require prior learning. Vector names are stored in the index: either in a numbering from zero to n, or as a number that fits the Int64 type.

A feature of FAISS is the Inverted File Index (IVF). This feature enables a relatively fast search of a set of vectors, where each vector may represent text or an image. However, even if this works in principle, the IVF may be too large to fit into RAM and be operated upon. FAISS provides a solution to this problem by using vector coding to reduce the storage requirement. This enables storage of the IVF on disk with only the metadata loaded into RAM.

In this context, vector coding refers to Scalar Quantization (SQ) and Product Quantization (PQ) and operates as a form of data compression. SQ is an encoding of each vector component with n bits (usually 8, 6, or 4 bits). However, in some cases PQ may be preferable because encoding one component of float32 type data with eight bits may entail an undesirable loss of accuracy (although in some cases, compressing SQfp16 to float16 type will be almost lossless in terms of accuracy).

FIG. 1(e) is a flowchart or flow diagram illustrating an example of an algorithm or process flow for identifying an opinion leader that may be incorporated in an embodiment of the disclosure. As shown in the figure, in one embodiment, raw (that is unprocessed) JSON and/or CSV data is input to the process (as suggested by step or stage 170). The raw data is pre-processed as disclosed and/or described herein (as suggested by step or stage 171). Next, an opinion leader algorithm, ruleset, or similar process is executed, as suggested by step or stage 172. The identified opinion leader or leaders are output as a list and/or CSV file for further analysis (as suggested by step or stage 173 and step or stage 174). Since the raw data is in JSON format or in CSV files, some pre-processing may be needed (for example, converting JSON to DataFrame format).

In one embodiment, the opinion leader algorithm or process is similar to a recommendation system. An example of such an approach may include one or more of the following steps, stages, functions, or operations:
- Choose 3-7 suitable profiles manually (to represent a "community core");
- Using the intersection of followers of those selected, identify people who are interested in the topic (those considered "passionate");
- Identify people connected to the "passionate" people and having a profile characteristic similar to that of the community core (preferably one such as a common employment or hobby characteristic of the core);
    - Add these people to the "core" grouping;
- Repeat the above steps as needed and add to the core until a stable result is reached;
- Determine an intersection of all followers of the identified core members;
- Examiner the distribution of the determined followers;
- Based on the distribution, identify/estimate the number of followers of each of the core members and select the followers of one or more of the core members (such as a common group or set of those who follow a majority of the identified core members);
  These people may represent those with a sufficient interest in the profiles of the core member(s) to be significant;
  Identify the followers of those having such a sufficient or significant interest;
    Identify those among the followers (of those having such a sufficient or significant interest) having a profile characteristic similar to that of the community core member(s);
  Output the determined list of followers.

As described, FIG. 1(f) is a flowchart or flow diagram illustrating an example of an algorithm or process flow for resolving ambiguity presented by multiple accounts that are associated with a person having the same (common) name (such as John Smith). The illustrated approach may be used to determine if a person with the same or similar name (e.g., John Smith) in different networks is the same person for purposes of the disclosed and/or described evaluation.

In one embodiment, a process flow attempts to solve this "problem" with a minimum amount of information required from the customer and in an algorithmic form that allows for wide use. To this end, the problem is addressed by using data for each person (even if of the second order, such as a friend, colleague or relative) which is likely to be available. As a non-limiting example, this may include one or more of the following:
  Sex/gender
  Birth date
  Place of work
For a person being evaluated, in some embodiments, the following information may be helpful:
  Full name
  Sex/gender
  Birth date
  One or more relatives (full names)
  One or more friends (full names)
  Place of work
  One or more colleagues (full names)

After solving the name matching problem (as described previously with reference to FIG. 1(d)), the problem of finding the correct John Smith may be solved by finding a match to a person having the name and same birthday, place of work, and set of friends, relations, or colleagues. In one example case, this approach finds a narrowed set of candidates using external data as a fuzzy key for searching. For each John Smith, count the weight, and for each successfully connected follow, assign +1. In the final round, the John Smith with the highest weight is assumed to be the correct one.

Referring to FIG. 1(f), in an example use case, a corporation wants to perform a post-employment social media screening and attempts to find a John Smith from California that knows or has relations with the following people:
  Mary Smith
  Tommy Smith
  Tony Higgins
  Charlotte Tilbury
  Kim Jong Un Assume for this example that 5 John Smiths were found in a database, and 2 of them are from CA. To verify the approach, all were check using the disclosed and/or described method. Assume 2 of the 5 follow Mary Smith. One has a sister with that name, and another has a wife. Finally, only one passed the linkage check.

In this situation, the first John's weight is 1 because he has only one link and the second received for each linkage +1, for a total of 3. Thus, the approach indicates that the desired John Smith is the one with a value of 3. In general, the larger the portion of the key that matches, the larger the match metric value. In some cases, note that even a partial key match results in an accurate mapping to person and account.

Auxiliary approaches to narrow down the search query may include the following "models" or heuristics:
  Gender classification
  A log reg that takes as input a combination of normalized names statistics and a prediction from a nested model that determines gender from the account description. The two models are blended into one. The usual log reg on dictionaries of words popularized by a biography may be used; and/or
    Age prediction—NER (named entity recognition) that allows extracting the age of an entity.

Figure 2:
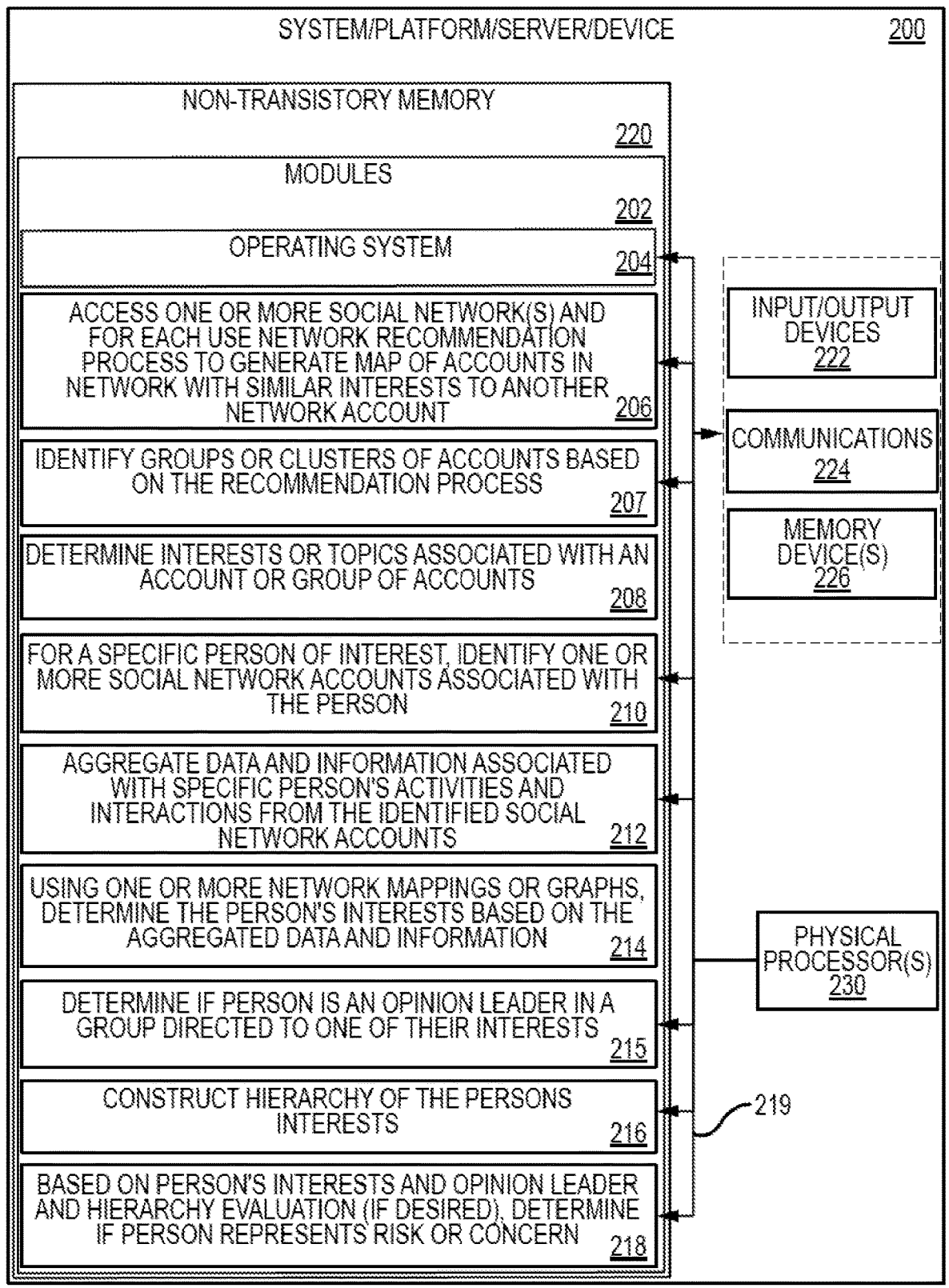
FIG. 2 is a diagram illustrating elements or components that may be present in a computing device or system configured to implement a method, process, function, or operation in accordance with an embodiment of the system and methods disclosed herein.

FIG. 2 is a diagram illustrating elements or components that may be present in a computing device, apparatus, server, or system 200 configured to implement a method, process, function, or operation in accordance with some embodiments. In some embodiments, the disclosed and/or described system and methods may be implemented in the form of an apparatus that includes a processing element and a set of computer-executable instructions stored in (or on) a non-transitory computer-readable medium. The executable instructions may be part of a software application and arranged into a software architecture.

In general, an embodiment of the disclosure may be implemented using a set of software instructions that are executed by a suitably programmed processing element (such as a GPU, TPU, CPU, microprocessor, processor, controller, state machine, or other form of computing device, as examples). In a complex application or system such instructions are typically arranged into "modules" with each such module typically performing a specific task, process, function, or operation. The entire set of modules may be controlled or coordinated in their operation by an operating system (OS) or other form of organizational platform.

Modules and/or sub-modules may include a suitable computer-executable code or set of instructions (e.g., as would be executed by a suitably programmed processor, microprocessor, CPU, or GPU), such as computer-executable code corresponding to a programming language. For example, programming language source code may be compiled into computer-executable code. Alternatively, or in addition, the programming language may be an interpreted programming language such as a scripting language.

As shown in FIG. 2, system 200 may represent a server, platform, or other form of computing or data processing device. Modules 202 each contain a set of executable instructions, where when the set of instructions are executed by a suitable electronic processor (such as that indicated in the figure by "Physical Processor(s) 230"), system (or server, platform, or device) 200 operates to perform a specific process, operation, function, or method.

Modules 202 may contain one or more sets of executable instructions for performing a method or function disclosed herein and/or described with reference to the Figures, and the descriptions of the functions and operations provided in the specification. The modules may include those illustrated but may also include a greater number or fewer number than those illustrated. Further, the modules and the set of computer-executable instructions that are contained in the modules may be executed by the same processor or by more than a single processor.

Modules 202 are stored in a (non-transitory) memory 220, which typically includes an Operating System module 204 that contains instructions used (among other functions) to access and control the execution of the instructions contained in other modules. The modules 202 in memory 220 are accessed for purposes of transferring data and executing instructions by use of a "bus" or communications line 219, which also serves to permit processor(s) 230 to communicate with the modules for purposes of accessing and executing a set of instructions.

Bus or communications line 219 also permits processor(s) 230 to interact with other elements of system 200, such as input or output devices 222, communications elements 224 for exchanging data and information with devices external to system 200, and additional memory devices 226.

Each module or sub-module may correspond to a specific function, method, process, or operation that is implemented by execution of the instructions contained in the module or sub-module. That is, each module or sub-module may contain computer-executable instructions that when executed by a programmed processor or processors cause the processor or processors (or a device or devices in which they are contained) to perform the specific function, method, process, or operation. Such function, method, process, or operation may include those used to implement one or more aspects of the disclosed and/or described system and methods, such as to:

Access One or More Social Network(s) and for Each Use Network Recommendation Process to Generate/Construct Map of Accounts in Network with Similar Interests to Another Network Account (as suggested by module 206);

Identify Groups or Clusters of Accounts in a Network Based on the Recommendation Process (as suggested by module 207);

Determine Interests or Topics Associated with An Account or Group (Cluster) of Accounts (module 208);

For a Specific Person of Interest, Identify One or More Social Network Accounts Associated with the Person (module 210);

Aggregate Data and Information Associated with the Person's Activities and Interactions from the Identified Social Network Accounts (module 212);

Using One or More Network Mappings or Graphs, Determine the Person's Interests Based on the Aggregated Data and Information (module 214);

This may include determining which groups or clusters in a social network that the specific person is associated with;

This may include using a network's recommendation feature to identify groups or clusters the specific person might be interested in;

This may include using information about the specific person as a basis for searching a network mapping or graph (using embeddings, similarity metrics, or other techniques);

Determine If Person Is an Opinion Leader in a Group Directed to One of Their Interests (optional) (module 215);

Construct a Hierarchy of the Person's Interests (optional) (module 216); and

Based on the Person's Interests and if performed, the Opinion Leader and Hierarchy Evaluation, Determine if the Person Represents a Risk or Concern (module 218);

As non-limiting examples, this determination may be performed by a human evaluator and/or an automated process that includes consideration of one or more weighted interests or categories, a rule or formula for combining the weights, and a threshold value to determine when the combined weights exceed a specified value and indicate a concern;

The threshold value and/or weights may be determined by a human or in some cases (when sufficient reliable data is available), a model that is trained on publicly available data (such as arrest or complaint data) or organization-specific data (such as from hiring and retention data over time).

As mentioned, each module may contain instructions which when executed by a programmed processor cause an apparatus (such as a server or client device) to perform the specific function or functions. The apparatus may be one or both of a client device or a remote server or platform. Therefore, a module may contain instructions that are performed by a local client device, a server or platform, or both.

As mentioned, in some embodiments, the systems and methods disclosed and/or described herein may provide services through a SaaS or multi-tenant platform. The platform provides access to multiple entities, each with a separate account and associated data storage. Each account may correspond to a set of people, a source of data (such as a specific social network), or an organization (such as an employer), for example. Each account may access one or more services, a set of which are instantiated in their account, and which implement one or more of the methods or functions disclosed herein.

Figure 3:
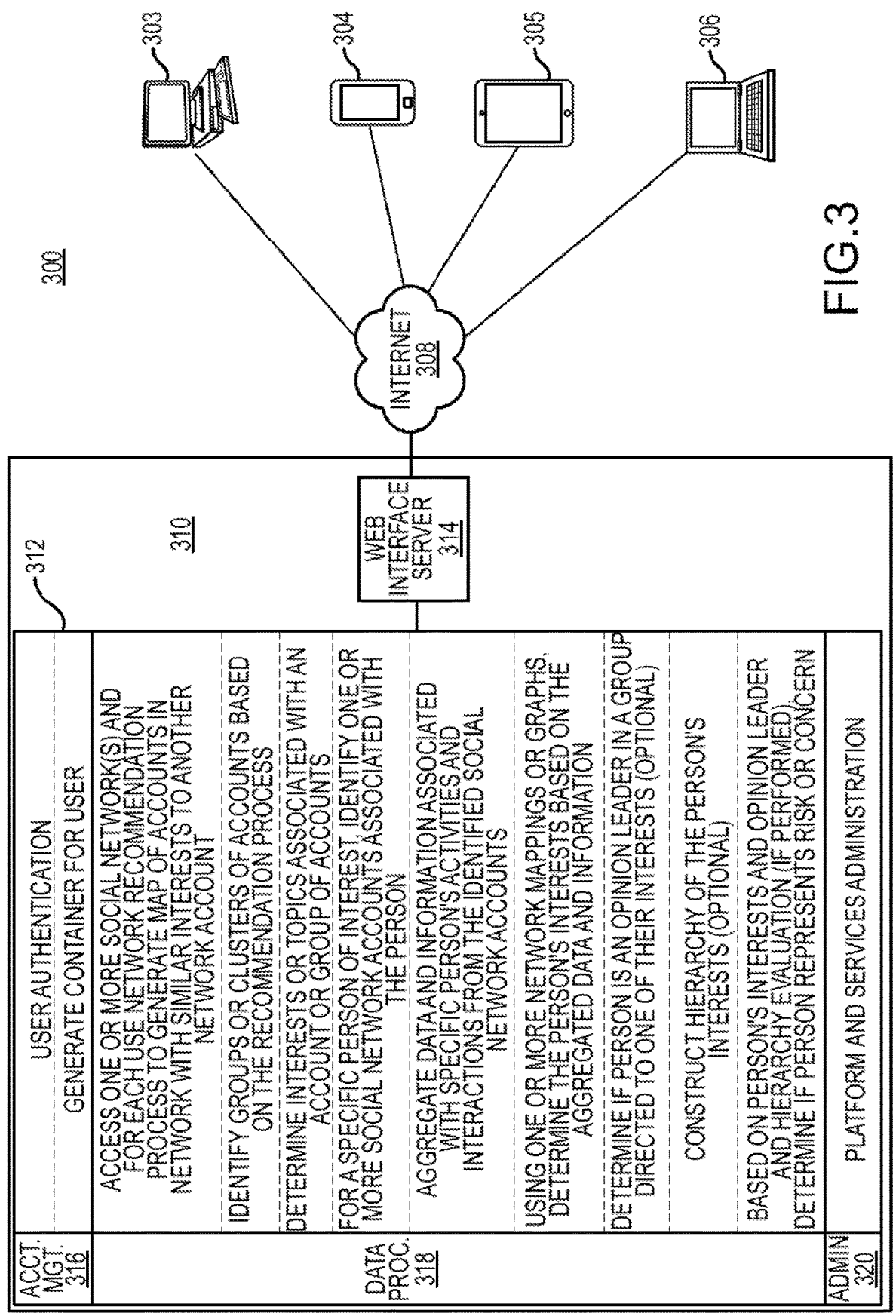
FIGS. 3-5 are diagrams illustrating an architecture for a multi-tenant or SaaS platform that may be used in implementing an embodiment of the systems and methods disclosed herein.
Figure 4:
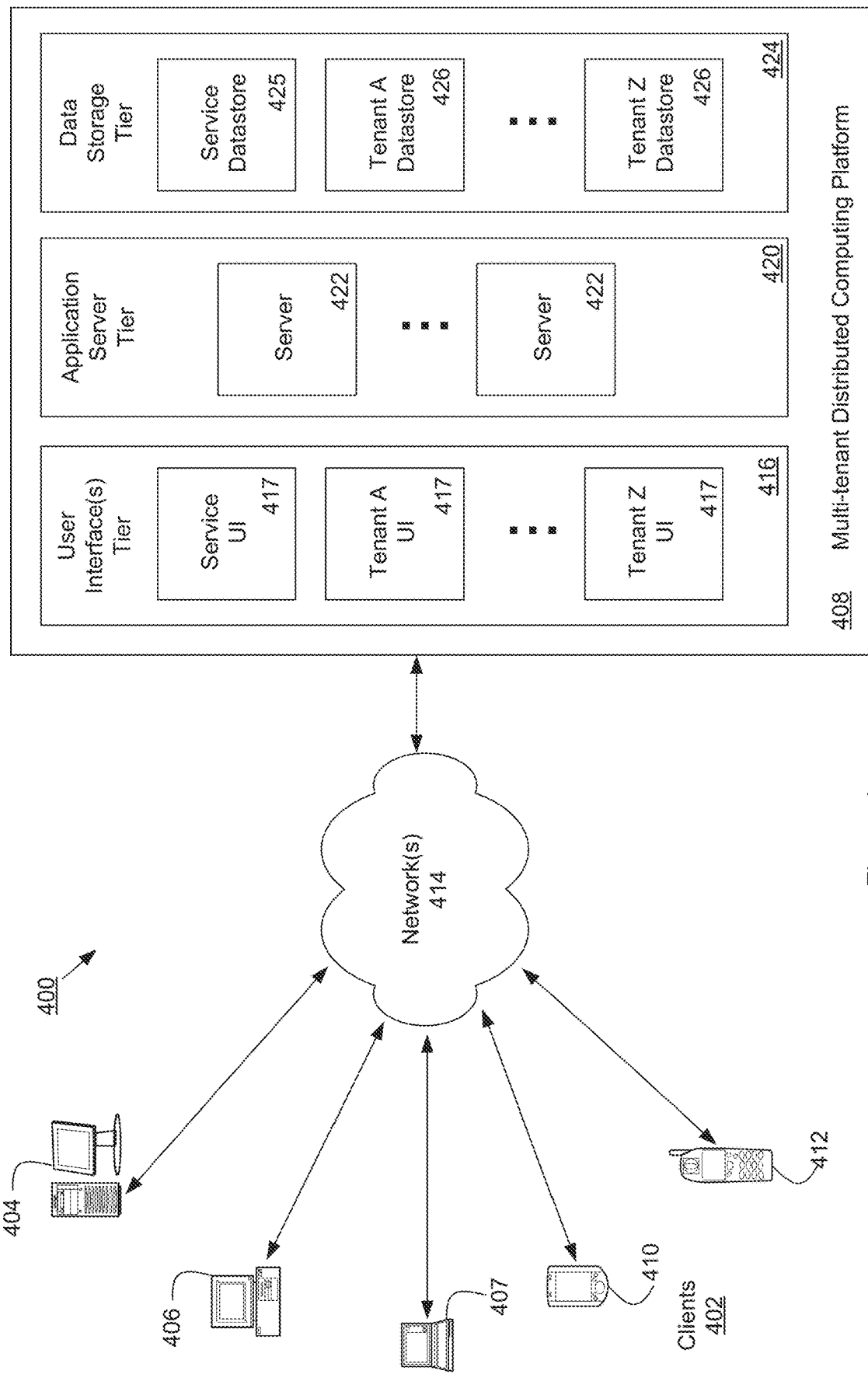
Figure 5:
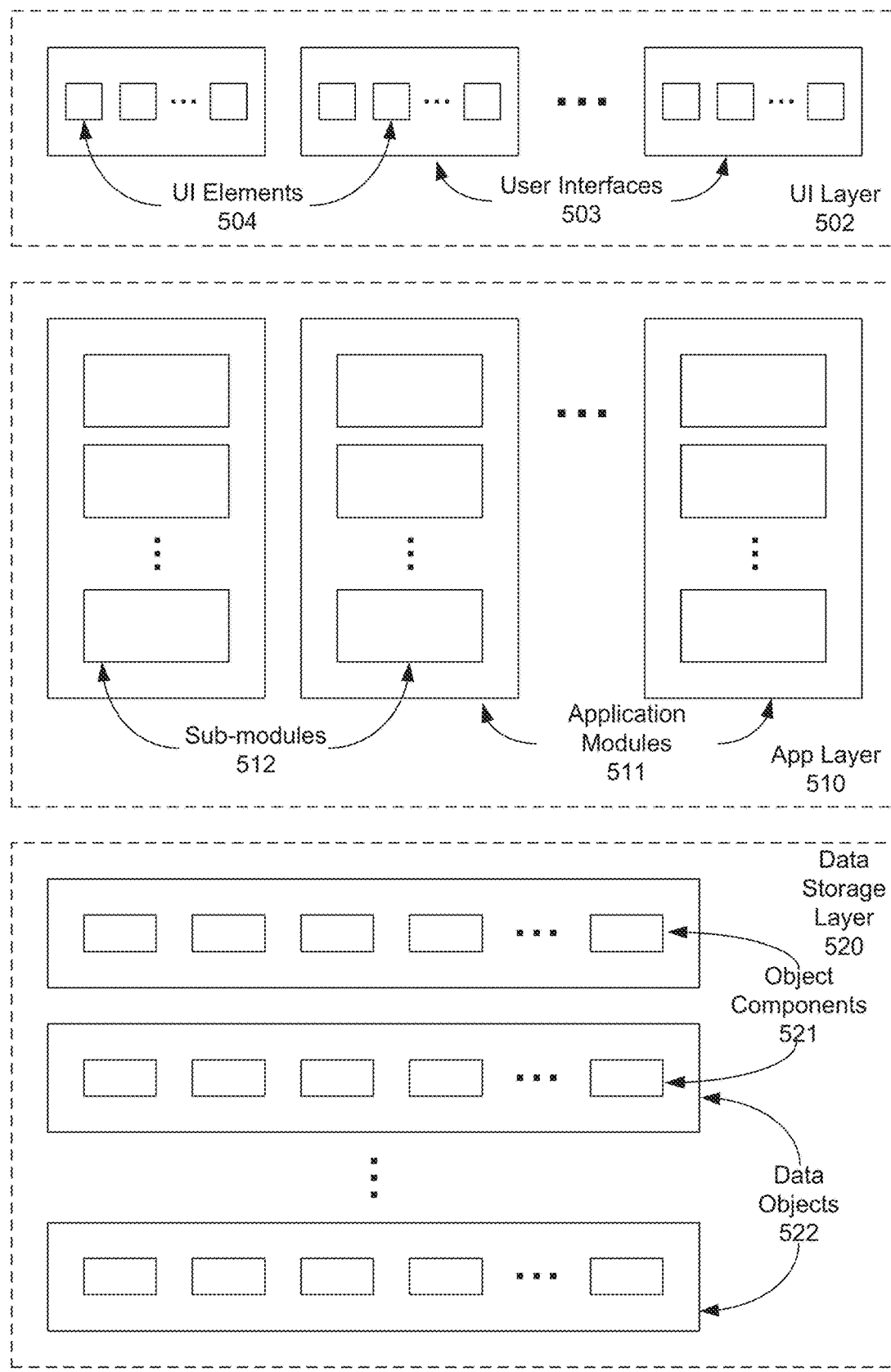

FIGS. 3-5 are diagrams illustrating an architecture for a multi-tenant or SaaS platform that may be used in implementing an embodiment of the systems and methods disclosed and/or described herein. FIG. 3 is a diagram illustrating a SaaS system in which an embodiment of the disclosure may be implemented. FIG. 4 is a diagram illustrating elements or components of an example operating environment in which an embodiment of the disclosure may be implemented. FIG. 5 is a diagram illustrating additional details of the elements or components of the multi-tenant distributed computing service platform of FIG. 4, in which an embodiment of the disclosure may be implemented.

In some embodiments, the system or service(s) disclosed and/or described herein may be implemented as micro-services, processes, workflows, or functions performed in response to a user request. The micro-services, processes, workflows, or functions may be performed by a server, data processing element, platform, or system. In some embodiments, the services may be provided by a service platform located "in the cloud". In such embodiments, the platform is accessible through APIs and SDKs.

The described social network mapping and interest determination for an account or group of accounts may be provided as micro-services within a platform for each of multiple users or companies. The interfaces to the micro-services may be defined by REST and GraphQL endpoints. An administrative console may allow users or a platform administrator to securely access the underlying request and response data, manage accounts and access, and in some cases, modify the processing workflow or configuration.

Note that although FIGS. 3-5 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the social network evaluation and determination of groupings and interests methodology disclosed and/or described herein.

Although in some embodiments, a platform or system of the type illustrated in FIGS. 3-5 may be operated by a 3rd party provider to provide a specific set of business-related applications, in other embodiments, the platform may be operated by a provider and a different business may provide the applications or services for users through the platform. For example, some of the functions and services described with reference to FIGS. 3-5 may be provided by a 3rd party with the provider of the applications or services maintaining an account on the platform for each company or business using the provider's services or applications.

FIG. 3 is a diagram illustrating a system 300 in which an embodiment of the disclosure may be implemented or through which the disclosed and/or described functionality may be accessed. In accordance with the advantages of an application service provider (ASP) hosted business service system (such as a multi-tenant data processing platform), users of the services/functions disclosed and/or described herein may comprise individuals, businesses, or organizations, as non-limiting examples.

A user may access the services using a suitable client, including but not limited to desktop computers, laptop computers, tablet computers, scanners, or smartphones, as examples. Users interface with the service platform across the Internet 308 or another suitable communications network or combination of networks. Examples of suitable client devices include desktop computers 303, smartphones 304, tablet computers 305, or laptop computers 306.

System 310, which may be hosted by a third party, may include a set of services 312 and a web interface server 314, coupled as shown in FIG. 3. Either or both services 312 and the web interface server 314 may be implemented on one or more different hardware systems and components, even though represented as singular units in FIG. 3.

In some embodiments, the set of services or applications 312 available to a company or user may include one or more that perform the functions and methods disclosed and/or described herein, and/or described with reference to the figures. As non-limiting examples, in some embodiments, the set of applications, functions, operations or services made available through the platform or system 310 may include:

account management services 316, such as
        A process or service to authenticate a person wishing to access the services/applications available through the platform (such as credentials or proof of purchase, verification that a user has been authorized by a company to use the services, etc.);
        A process or service to generate a container or instantiation of the services, methodology, applications, functions, and operations disclosed and/or described, where the instantiation may be customized for a particular user or company; and
        other forms of account management services;
    a set 318 of data processing services, applications, elements, operations, or functionality, such as a process or service to:
        Access One or More Social Network(s) and For Each Use Network Recommendation Process to Generate Map of Accounts in Network with Similar Interests to Another Network Account;
        Identify Groups or Clusters of Accounts Based on the Recommendation Process;
        Determine Interests or Topics Associated with An Account or Group of Accounts;
        For a Specific Person of Interest, Identify One or More Social Network Accounts Associated with the Person;
        Aggregate Data and Information Associated with Specific Person's Activities and Interactions from the Identified Social Network Accounts;
        Using One or More Network Mappings or Graphs, Determine the Specific Person's Interests Based on the Aggregated Data and Information;
            This may include determining which groups or clusters in a social network that the specific person is associated with;
                This may include using a network's recommendation feature to identify groups or clusters the specific person might be interested in;
            This may include using information about the specific person as a basis for searching a network mapping or graph (using embeddings, similarity metrics, or other techniques);
        Determine If the Specific Person Is an Opinion Leader in a Group Directed to One of Their Interests (optional);
        Construct Hierarchy of the Specific Person's Interests (optional); and
        Based on the Specific Person's Interests and Opinion Leader and Hierarchy Evaluation (if performed), Determine if Person Represents a Risk or Concern;
            As non-limiting examples, this determination may be performed by a human evaluator and/or an automated process that includes consideration of one or more weighted interests or categories, a rule or formula for combining the weights, and a threshold value to determine when the combined weights exceed a specified value and indicate a concern;
                The threshold value and/or weights may be determined by a human or in some cases (when sufficient reliable data is available), a model that is trained on publicly available data (such as arrest or complaint data) or organization-specific data (such as from hiring and retention data over time); and
    administrative services 320, such as
        a process or services to enable the provider of the data processing services and/or the platform to administer and configure the processes and services provided to users.

The platform or system shown in FIG. 3 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server.

FIG. 4 is a diagram illustrating elements or components of an example operating environment 400 in which an embodiment of the disclosure may be implemented. As shown, a variety of clients 402 incorporating and/or incorporated into a variety of computing devices may communicate with a multi-tenant service platform 408 through one or more networks 414. For example, a client may incorporate and/or be incorporated into a client application (e.g., software) implemented at least in part by one or more of the computing devices.

Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components, such as one or more electronic processors, microprocessors, central processing units (CPU), or controllers. Examples of suitable networks 414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as examples. Each application server or processing tier 422 shown in the figure may be implemented with a set of computers and/or components including computer servers and processors, and may perform various functions, methods, processes, or operations as determined by the execution of a software application or set of instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality and services used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically multiple, "servers."

As mentioned, rather than build and maintain such a platform or system themselves, a business may utilize systems provided by a third party. A third party may implement a business system/platform as described in the context of a multi-tenant platform, where individual instantiations of a business' data processing workflow are provided to users, with each company/business representing a tenant of the platform. One advantage to such multi-tenant platforms is the ability for each tenant to customize their instantiation of the data processing workflow to that tenant's specific business needs or operational methods.

FIG. 5 is a diagram illustrating additional details of the elements or components of the multi-tenant distributed computing service platform of FIG. 4, in which an embodiment of the disclosure may be implemented. In general, an embodiment of the disclosure may be implemented using a set of software instructions that are executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

The example architecture 500 includes a user interface layer or tier 502 having one or more user interfaces 503. Examples of such user interfaces include graphical user interfaces and application programming interfaces (APIs). Each user interface may include one or more interface elements 504. For example, users may interact with interface elements to access functionality and/or data provided by application and/or data storage layers of the example architecture.

Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 510 may include one or more application modules 511, each having one or more sub-modules 512. Each application module 511 or sub-module 512 may correspond to a function, method, process, or operation that is implemented by the module or sub-module (e.g., a function or process related to providing data processing and services to a user of the platform). Such function, method, process, or operation may include those used to implement one or more aspects of the disclosed and/or described system and methods, such as for one or more of the processes, services, or functions described with reference to the Figures or otherwise disclosed and/or described herein:

Access One or More Social Network(s) and For Each Use Network Recommendation Process to Generate Map of Accounts in Network with Similar Interests to Another Network Account;

Identify Groups or Clusters of Accounts Based on the Recommendation Process;

Determine Interests or Topics Associated with An Account or Group of Accounts;

For a Specific Person of Interest, Identify One or More Social Network Accounts Associated with the Person;

Aggregate Data and Information Associated with Specific Person's Activities and Interactions from the Identified Social Network Accounts;

Using One or More Network Mappings or Graphs, Determine the Specific Person's Interests Based on the Aggregated Data and Information;

This may include determining which groups or clusters in a social network that the specific person is associated with;

This may include using a network's recommendation feature to identify groups or clusters the specific person might be interested in;

This may include using information about the specific person as a basis for searching a network mapping or graph (using embeddings, similarity metrics, or other techniques;

Determine If the Specific Person Is an Opinion Leader in a Group Directed to One of Their Interests (optional);

Construct Hierarchy of the Specific Person's Interests (optional); and

Based on the Specific Person's Interests and Opinion Leader and Hierarchy Evaluation (if performed), Determine if Person Represents a Risk or Concern;

As non-limiting examples, this determination may be performed by a human evaluator and/or an automated process that includes consideration of one or more weighted interests or categories, a rule or formula for combining the weights, and a threshold value to determine when the combined weights exceed a specified value and indicate a concern;

The threshold value and/or weights may be determined by a human or in some cases (when sufficient reliable data is available), a model that is trained on publicly available data (such as arrest or complaint data) or organization-specific data (such as from hiring and retention data over time).

The application modules and/or sub-modules may include a suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 422 of FIG. 4) may include each application module. Alternatively, different application servers may include different sets of application modules. Such sets may be disjoint or overlapping.

The data storage layer 520 may include one or more data objects 522 each having one or more data object components 521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 3-5 are not intended to be limiting examples. Further environments in which an embodiment of the disclosure may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

In addition to, or instead of the use of the disclosed and/or described approach to identify a person with an interest that may be of concern, an embodiment of the disclosure may be used for one or more of the following purposes:

Developing a breakdown of user interests to provide better understanding of a particular individual's key areas/categories of interest.

This allows the user to identify potential risks associated with that person(s), the ability to highlight potential red flags, or to better understand potential cultural fit (misfit) issues of an individual to or within an organization;

Audience segmentation for marketing, advertising, or PR/GR purposes.

Companies regularly segment audience(s) or populations of individuals to achieve impressions or exposure targets. (e.g., for an action sports enthusiast it is logical to show ads to action sports related moments.) The disclosed segmentation capabilities can be used to improve a conversion rate from advertising message. The segmentation analysis and results are based on each individual's likes, followings, posts, and photos to identify rare segments and crossover between individuals;

Selecting opinion leaders to disseminate data and messaging.

By collecting user follows, the disclosed approach also provides a measure of the followings of the Influencers related to specific categories of interest(s). The disclosed approach is a tool that can be used for media planning and can impact such metrics as reach, frequency, cost per thousand (CPM), etc. This enables planning a media campaign in the style of a specified media;

Calculating and measuring the flow of information.

Different social networks have different rates of information dissemination, dispersion, and reach. This is because on some social media platforms, a share/repost is allowed, in others this ability is absent or constrained. With a graph of the social network and information about the latest posts of users, one can calculate the waiting time for the appearance of a post/topic that has gone viral and has been duplicated by a group of users. In addition, one can identify people who are early adopters. Thus, one can reduce the budget or increase the efficiency for developing a new idea or brand;

Matching an ideal/potential partner by similarity for friendship, dating or partnership purposes.

Having the same or different interests as another person can be used to assess the compatibility of an individual to another person. Another possible search for similar/dissimilar people is to directly match them using a followers graph, rather than by their interests, or by their interests alone. This would provide a filter-sorted population of people who might be of interest for socializing, friendship, or dating (e.g., match-making).

Graph matching facilitates more complex strategies as well. For example, one can collect a sample of people who are engaged/married and identify possible compatibility metrics that are indicators of long-term marriage successes/failures. Identifying different segments of individuals during the selection of a partner (depending on the goal(s) of the search for optimization) can be dependent on a specific query's purpose: communication, a serious relationship, or a brief meeting—in each case to provide population data of other potentially relevant individuals to a user;

Selecting locations and places of interest for traveling using LaL ("look-alike") segmentation on the behalf of an interested party.

An embodiment can improve the travel experience of an individual by picking socially relevant places to visit. Since the disclosed process can find LaL or similarities for a user who is on a social network using their followers graph, one can identify places to visit for that group that are categorically special to them, but not specific to other groups; thereby identifying special travel destinations, and improving the travel experience;

Finding similar people to join an organization, in terms of skill set and caliber of fit, for corporate, social and all other types of entities.

LaL ("Look-alike") searches provides the ability to complement CVs and search briefs, influencing the selection of people to hire using similarity assessments to those who are already a member of an organization;

Determination of brand similarity and difference by a set of parameters (multidimensional scaling).

Having knowledge of followers of different brands, an embodiment can build an analysis model that shows which brands are most similar to each other, essentially clustering them into a newly developed category. At the same time, following(s) analysis allows the identification of how these clusters/communities differ from each other, which can be used for the development of a directed marketing and media strategy;

Building operational response models for the detection of mental disorders, identification of suicidal factors, etc.

Having a database of users, each of whom has a set of dynamic attributes collected from a social networks graph, an embodiment can build models of operational response to changes in a person's behavior, thus preventing an event or action that could occur. Such triggers can be used to help those who need help or for other activities;

Determining basal psychological characteristics (character, temperament, or other characteristic) of an individual or group.

Using external markup in the form of psychological tests, an embodiment can assign/transfer the data, with modeling, to a social network. An embodiment can identify segments of communications by interest, but also highlight the style of communication with a given audience, identifying their stress, openness, schizoid-ism, neuroticism or other personality trait;

Facilitation of virtual focus group development.

Creating or building focus groups using data from a selected segment, an embodiment can build an array of parameters/indicators that cover a range of topics to use as a knowledge base for modeling a virtual focus group, thereby replacing more expensive surveys and non-scientific (and possibly invalid) selection processes;

Econometric scoring of similar or disparate geographical regions.

By analyzing the likes and follows of disparate geographic areas, an embodiment can track the connection (or lack thereof) between regions and graph the growth of socio-economic activity and cultural interconnectivity within and between regions;

Facilitate and/or influence the selection of jurors.

An embodiment can detect inherent user bias based on their social media followings and likes. This may help a plaintiff or defendant attorney simplify and/or influence a jury selection process;

Preparatory activities for an individual's deposition(s) in lawsuits, legal actions and/or law practice activities.

Understanding and/or the development of a list of an individual's detected interests, conscious or subconscious, based on their social network followings/likes may help to identify or assess a person's bias, helping a law firm to conduct more effective depositions;

Facilitation of private investigation and employment agency activities.

Since embodiments analyze a large amount of public information about a person, the process can provide a basis for private investigations and/or employment agencies. Evidence can be specific to a particular case, such as a photo or statistical evidence, or pertaining to the frequency of likes, follows, or visits to certain sources of information.

The disclosure includes the following clauses and embodiments:

1. A method of determining a person's interests as represented by their social network activity, comprising:
   accessing a specific social network;
   iteratively using the specific social network's recommendation process to construct a map of accounts in the specific social network with a similar interest to another account in the specific social network;
   identifying one or more groups or clusters of accounts in the specific social network based on the result of using the recommendation process;
   determining an interest or topic associated with each of the identified groups or clusters of accounts in the specific social network;
   identifying one or more social network accounts associated with a person whose interests are to be determined;
   aggregating data and information associated with the person's activities and interactions from the identified one or more social network accounts;
   using the specific social network's constructed map and based on the aggregated data and information, determining one or more of the identified groups or clusters containing the account associated with the person;
   based on the one or more identified groups or clusters containing the account associated with the person, determining an interest or interests of the person; and
   generating a representation of the person's interests to a user.

2. The method of clause 1, wherein using the specific social network's constructed map to determine one or more of the identified groups or clusters containing the account associated with the person further comprises one or more of:
   using the specific social network's recommendation feature to identify groups or clusters the person might be interested in; and
   using information about the person as a basis for searching the map of the specific social network.

3. The method of clause 1, wherein the aggregate data and information associated with the person's activities and interactions from the identified social network accounts further comprises one or more of images, videos, links, posts, and messages.

4. The method of clause 1, wherein determining an interest or topic associated with each of the identified groups or clusters of accounts further comprises:

identifying one or more groups of accounts based on the constructed map; and for each identified group, assigning a label representing an interest or topic.

5. The method of clause 4, wherein assigning a label representing an interest or topic to each of the identified groups further comprises processing one or more of content, posts, images, icons, or video associated with one or more accounts in the identified group of accounts.

6. The method of clause 5, wherein the processing comprises using one or more of natural language processing, natural language understanding, image processing, or sentiment processing.

7. The method of clause 1, further comprising one or more of:

determining if the person is an opinion leader in a group directed to one of their interests, and if so, using that information as part of determining if the person represents a risk or concern; and constructing a hierarchy of the person's interests and using that information as part of determining if the person represents a risk or concern.

8. The method of clause 1, wherein the constructed map is a graph comprising a set of nodes and edges connecting a node in the set of nodes to one or more other nodes of the graph, wherein each node in the set of nodes represents an account or user of the specific social network.

9. The method of clause 1, further comprising based on the person's interests, determining if the person represents a risk or concern using a human evaluator or automated process by evaluating the person's interests and determining if those interests indicate a risk or concern related to one or more of reputational risk, a health risk to others, financial risk, or a safety risk to themselves or others.

10. The method of clause 9, wherein determining if the person represents a risk or concern using a human evaluator or automated process further comprises consideration of one or more weighted interests or categories of interests, a rule or formula for combining the weights, and a threshold value to determine when the combined weights exceed a specified value and indicate a concern.

11. The method of clause 1, further comprising:

presenting the user with a user interface enabling the user to specify one or more interests of concern to the user; and based on the user's specification of one or more interests of concern, notifying the user if the person's social network activity indicates or suggests an interest in the specified one or more interests.

12. A system for determining a person's interests as represented by their social network activities, comprising:

one or more electronic processors configured to execute a set of computer-executable instructions; and one or more non-transitory computer-readable media including the set of computer-executable instructions, wherein when executed, the instructions cause the one or more electronic processors or a device or apparatus in which the processors are contained to:

access a specific social network;

iteratively use the specific social network's recommendation process to construct a map of accounts in the specific social network with a similar interest to another account in the specific social network;

identify one or more groups or clusters of accounts in the specific social network based on the result of using the recommendation process;

determine an interest or topic associated with each of the identified groups or clusters of accounts in the specific social network;

identify one or more social network accounts associated with a person whose interests are to be determined;

aggregate data and information associated with the person's activities and interactions from the identified one or more social network accounts;

use the specific social network's constructed map and based on the aggregated data and information, determine one or more of the identified groups or clusters containing the account associated with the person;

based on the one or more identified groups or clusters containing the account associated with the person, determine an interest or interests of the person; and generate a representation of the person's interests to a user.

13. The system of clause 12, wherein using the specific social network's constructed map to determine one or more of the identified groups or clusters containing the account associated with the person further comprises one or more of:

using the specific social network's recommendation feature to identify groups or clusters the person might be interested in; and using information about the person as a basis for searching the map of the specific social network.

14. The system of clause 12, wherein the aggregate data and information associated with the person's activities and interactions from the identified social network accounts further comprises one or more of images, videos, links, posts, and messages.

15. The system of clause 12, wherein determining an interest or topic associated with each of the identified groups or clusters of accounts further comprises:

identifying one or more groups of accounts based on the constructed map; and for each identified group, assigning a label representing an interest or topic.

16. The system of clause 15, wherein assigning a label representing an interest or topic to each of the identified groups further comprises processing one or more of content, posts, images, icons, or video associated with one or more accounts in the identified group of accounts.

17 The system of clause 12, further comprising based on the person's interests, determining if the person represents a risk or concern using a human evaluator or automated process by evaluating the person's interests and determining if those interests indicate a risk or concern related to one or more of reputational risk, a health risk to others, financial risk, or a safety risk to themselves or others.

18. The system of clause 12, further comprising:

presenting the user with a user interface enabling the user to specify one or more interests of concern to the user; and based on the user's specification of one or more interests of concern, notifying the user if the person's social network activity indicates or suggests an interest in the specified one or more interests.

19. One or more non-transitory computer-readable media including a set of computer-executable instructions that when executed by one or more programmed electronic processors, cause the processors or a device or apparatus in which the processors are contained to:
access a specific social network;
iteratively use the specific social network's recommendation process to construct a map of accounts in the specific social network with a similar interest to another account in the specific social network;
identify one or more groups or clusters of accounts in the specific social network based on the result of using the recommendation process;
determine an interest or topic associated with each of the identified groups or clusters of accounts in the specific social network;
identify one or more social network accounts associated with a person whose interests are to be determined;
aggregate data and information associated with the person's activities and interactions from the identified one or more social network accounts;
use the specific social network's constructed map and based on the aggregated data and information, determine one or more of the identified groups or clusters containing the account associated with the person;
based on the one or more identified groups or clusters containing the account associated with the person, determine an interest or interests of the person; and
generate a representation of the person's interests to a user.
20. The non-transitory computer-readable media of clause 19, wherein determining an interest or topic associated with each of the identified groups or clusters of accounts further comprises identifying one or more groups of accounts based on the constructed map and for each identified group, assigning a label representing an interest or topic, and wherein using the specific social network's constructed map to determine one or more of the identified groups or clusters containing the account associated with the person further comprises one or more of using the specific social network's recommendation feature to identify groups or clusters the person might be interested in and using information about the person as a basis for searching the map of the specific social network.
21. The method of clause 1, wherein the one or more groups or clusters of accounts are identified using a metric or metrics that represent an aspect or aspects of the constructed map.
22. The method of clause 1, wherein further comprising:
accessing a plurality of social networks;
using each social network's process for recommending an account or content of interest to generate a map of accounts with similar interests to another account of that network;
identifying one or more groups or clusters of accounts in each of the plurality of social networks based on the recommendation process of that social network; and
determining an interest or topic associated with each of the identified groups or clusters of accounts in each of the plurality of social networks.

Embodiments as disclosed and/or described herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or instances or example, in the form of one or more parameters, variables, characteristics or "features") of the set of training data is associated with a label or annotation that defines how the element should be classified by the trained model. A machine learning model in the form of a neural network is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform.

A trained neural network, trained machine learning model, or other form of decision or classification process may be used to implement one or more of the methods, functions, processes, or operations disclosed and/or described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" (nodes) that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions disclosed and/or described herein may be implemented as software code to be executed by a processor using any suitable computer language such as Python, Java, JavaScript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods disclosed and/or described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of all examples, or exemplary language (e.g., "such as") provided herein, is intended merely to better illuminate embodiments of the disclosure and does not pose a limitation to the scope of the invention unless otherwise claimed. No language in the specification should be construed as indicating any non-claimed element as essential to each embodiment of the disclosure.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this specification. Accordingly, the disclosed invention is not limited to the embodiments described above or depicted in the drawings, and various embodiments and modifications may be made without departing from the scope of the claims below.

What is claimed is:

1. A method of determining a person's interests as represented by their social network activity, comprising:
    accessing a specific social network;
    iteratively using the specific social network's recommendation process to construct a map of accounts in the specific social network, wherein the recommendation process operates to automatically generate an account expected to be of interest to a first account, and wherein iterative use of the recommendation process produces a graph of nodes representing accounts and a connection between two nodes indicates that the recommendation process expects that a person or persons associated with each of the two accounts have a common interest;
    identifying one or more groups or clusters of accounts in the specific social network based on the result of using the recommendation process, wherein each group or cluster includes more than two accounts;
    determining an interest or topic associated with each of the identified groups or clusters of accounts in the specific social network based at least in part on content posted or activities engaged in by one or more members of an identified group or cluster;
    identifying one or more social network accounts associated with a person whose interests are to be determined;
    aggregating data and information associated with the person's activities and interactions from the identified one or more social network accounts;
    using the specific social network's constructed map of accounts and based on the aggregated data and information, determining one or more of the identified groups or clusters containing the account associated with the person;
    based on the one or more identified groups or clusters containing the account associated with the person, determining an interest or interests of the person; and
    generating a representation of the person's interests to a user, wherein the representation comprises a list of one or more interests of the person as reflected by their social network posts and activities.

2. The method of claim 1, wherein using the specific social network's constructed map of accounts to determine one or more of the identified groups or clusters containing the account associated with the person further comprises one or more of:
    using the specific social network's recommendation feature to identify groups or clusters the person might be interested in; and
    using information about the person as a basis for searching the map of accounts of the specific social network.

3. The method of claim 1, wherein the aggregate data and information associated with the person's activities and interactions from the identified one or more social network accounts further comprises one or more of images, videos, links, posts, and messages.

4. The method of claim 1, wherein determining an interest or topic associated with each of the identified groups or clusters of accounts in the specific social network further comprises:
    identifying one or more groups or clusters of accounts based on the constructed map of accounts; and
    for each identified group or cluster, assigning a label representing an interest or topic.

5. The method of claim 4, wherein assigning a label representing an interest or topic to each of the identified groups or clusters of accounts further comprises processing one or more of content, posts, images, icons, or video associated with one or more accounts in the identified group or cluster of accounts.

6. The method of claim 5, wherein the processing one or more of content, posts, images, icons, or video associated with one or more accounts in the identified group or cluster of accounts further comprises using one or more of natural language processing, natural language understanding, image processing, or sentiment processing.

7. The method of claim 1, further comprising one or more of:
    determining if the person is an opinion leader in a group or cluster directed to one of their interests, and if so, using that information as part of determining if the person represents a risk or concern; and
    constructing a hierarchy of the person's interests and using that information as part of determining if the person represents a risk or concern.

8. The method of claim 1, wherein the constructed map of accounts is a graph comprising a set of nodes and edges connecting a node in the set of nodes to one or more other nodes of the graph, wherein each node in the set of nodes represents an account or user of the specific social network.

9. The method of claim 1, further comprising based on the person's interest or interests, determining if the person represents a risk or concern using a human evaluator or automated process by evaluating the person's interest or interests and determining if the interest or interests indicate a risk or concern related to one or more of a reputational risk, a health risk to others, a financial risk, or a safety risk to themselves or other.

10. The method of claim 9, wherein determining if the person represents a risk or concern using a human evaluator or automated process further comprises consideration of one or more of weighted interests or categories of interests, a rule or formula for combining the weights, and a threshold value to determine when the combined weights exceed a specified value and indicate a risk or concern.

11. The method of claim 1, further comprising:
    presenting the user with a user interface enabling the user to specify one or more interests representing a risk or concern; and
    based on the user's specification of one or more interests of risk or concern, notifying the user if the person's social network activity indicates or suggests an interest in the specified one or more interests.

12. A system for determining a person's interests as represented by their social network activities, comprising:
    one or more electronic processors configured to execute a set of computer-executable instructions; and
    one or more non-transitory computer-readable media including the set of computer-executable instructions, wherein when executed, the instructions cause the one or more electronic processors or a device or apparatus in which the processors are contained to:
    access a specific social network;
    iteratively use the specific social network's recommendation process to construct a map of accounts in the specific social network, wherein the recommendation process operates to automatically generate an account expected to be of interest to a first account, and wherein iterative use of the recommendation process produces a graph of nodes representing accounts and a connection between two nodes indicates that the recommendation process a person or persons associated with each of the two accounts have a common interest;

identify one or more groups or clusters of accounts in the specific social network based on the result of using the recommendation process, wherein each group or cluster includes more than two accounts;

determine an interest or topic associated with each of the identified groups or clusters of accounts in the specific social network based at least in part on content posted or activities engaged in by one or more members of an identified group or cluster;

identify one or more social network accounts associated with a person whose interests are to be determined;

aggregate data and information associated with the person's activities and interactions from the identified one or more social network accounts;

use the specific social network's constructed map of accounts and based on the aggregated data and information, determine one or more of the identified groups or clusters containing the account associated with the person;

based on the one or more identified groups or clusters containing the account associated with the person, determine an interest or interests of the person; and generate a representation of the person's interests to a user, wherein the representation comprises a list of one or more interests of the person as reflected by their social network posts and activities.

13. The system of claim 12, wherein using the specific social network's constructed map of accounts to determine one or more of the identified groups or clusters containing the account associated with the person further comprises one or more of:

using the specific social network's recommendation feature to identify groups or clusters the person might be interested in; and using information about the person as a basis for searching the map of accounts of the specific social network.

14. The system of claim 12, wherein the aggregate data and information associated with the person's activities and interactions from the identified one or more social network accounts further comprises one or more of images, videos, links, posts, and messages.

15. The system of claim 12, wherein determining an interest or topic associated with each of the identified groups or clusters of accounts in the specific social network further comprises:

identifying one or more groups or clusters of accounts based on the constructed map of accounts; and for each identified group or cluster, assigning a label representing an interest or topic.

16. The system of claim 15, wherein assigning a label representing an interest or topic to each of the identified groups or clusters of accounts further comprises processing one or more of content, posts, images, icons, or video associated with one or more accounts in the identified group or cluster of accounts.

17. The system of claim 12, further comprising based on the person's interest or interests, determining if the person represents a risk or concern using a human evaluator or automated process by evaluating the person's interest or interests and determining if that interest or interests indicate a risk or concern related to one or more of a reputational risk, a health risk to others, a financial risk, or a safety risk to themselves or other.

18. The system of claim 12, further comprising:

presenting the user with a user interface enabling the user to specify one or more interests of risk or concern; and based on the user's specification of one or more interests of risk or concern, notifying the user if the person's social network activity indicates or suggests an interest in the specified one or more interests.

19. One or more non-transitory computer-readable media including a set of computer-executable instructions that when executed by one or more programmed electronic processors, cause the processors or a device or apparatus in which the processors are contained to:

access a specific social network;

iteratively use the specific social network's recommendation process to construct a map of accounts in the specific social network, wherein the recommendation process operates to automatically generate an account expected to be of interest to a first account, and wherein iterative use of the recommendation process produces a graph of nodes representing accounts and a connection between two nodes indicates that the recommendation process expects that a person or person associated with each of the two accounts have a common interest;

identify one or more groups or clusters of accounts in the specific social network based on the result of using the recommendation process, wherein each group or cluster includes more than two accounts;

determine an interest or topic associated with each of the identified groups or clusters of accounts in the specific social network based at least in part on content posted or activities engaged in by one or more members of an identified group or cluster;

identify one or more social network accounts associated with a person whose interests are to be determined;

aggregate data and information associated with the person's activities and interactions from the identified one or more social network accounts;

use the specific social network's constructed map of accounts and based on the aggregated data and information, determine one or more of the identified groups or clusters containing the account associated with the person;

based on the one or more identified groups or clusters containing the account associated with the person, determine an interest or interests of the person; and generate a representation of the person's interests to a user, wherein the representation comprises a list of one or more interests of the person as reflected by their social network posts and activities.

20. The non-transitory computer-readable media of claim 19, wherein determining an interest or topic associated with each of the identified groups or clusters of accounts in the specific social network further comprises identifying one or more groups of accounts based on the constructed map and for each identified group, assigning a label representing an interest or topic, and wherein using the specific social network's constructed map to determine one or more of the identified groups or clusters containing the account associated with the person further comprises one or more of using the specific social network's recommendation feature to identify groups or clusters the person might be interested in and using information about the person as a basis for searching the map of the specific social network.

* * * * *